(12) United States Patent
Suzuki

(10) Patent No.: US 8,471,552 B2
(45) Date of Patent: Jun. 25, 2013

(54) ROTATIONAL ANGLE-MEASUREMENT APPARATUS AND ROTATIONAL SPEED-MEASUREMENT APPARATUS

(75) Inventor: Mutsumi Suzuki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 480 days.

(21) Appl. No.: 12/750,244

(22) Filed: Mar. 30, 2010

(65) Prior Publication Data

US 2010/0321006 A1 Dec. 23, 2010

(30) Foreign Application Priority Data

Jun. 18, 2009 (JP) ................................. 2009-144863

(51) Int. Cl.
*G01B 7/30* (2006.01)
(52) U.S. Cl.
USPC .................................. 324/207.25; 324/207.21
(58) Field of Classification Search
None
See application file for complete search history.

(56) References Cited

U.S. PATENT DOCUMENTS

| | | | | |
|---|---|---|---|---|
| 7,298,395 B2 * | 11/2007 | Fukaya et al. | ................ | 348/149 |
| 2003/0135314 A1 | 7/2003 | Saito et al. | | |
| 2008/0116886 A1 * | 5/2008 | Yamada et al. | ........... | 324/207.21 |
| 2008/0211494 A1 * | 9/2008 | Van Zon et al. | ................ | 324/252 |
| 2009/0058407 A1 | 3/2009 | Kanekawa et al. | | |

FOREIGN PATENT DOCUMENTS

| | | |
|---|---|---|
| JP | 2003-189546 A | 7/2003 |
| JP | 3799270 B2 | 7/2003 |
| JP | 2008-11661 A | 1/2008 |
| JP | 2008-134215 A | 6/2008 |
| JP | 2008-151774 A | 7/2008 |
| JP | 2009-58291 A | 3/2009 |

\* cited by examiner

*Primary Examiner* — Minh N Tang
(74) *Attorney, Agent, or Firm* — Crowell & Moring LLP

(57) ABSTRACT

A rotational angle-measurement apparatus with high accuracy is provided through electric correction of the rotational angle-measurement apparatus by rotating the rotation shaft at a constant speed. The rotational angle-measurement apparatus includes an electric motor having a rotation shaft, a magnet mounted on one end of the rotation shaft, and a magnetic sensor with an output signal that changes in accordance with an orientation of a magnetic field surrounding the magnetic sensor. The magnetic sensor outputs an angle signal representing the rotational angle of the rotation shaft, and the correction procedure utilizes rotation of the electric motor shaft through more than one revolution at a rotational speed with a known rate of change.

6 Claims, 15 Drawing Sheets

FIG.10

| | |
|---|---|
| | Offset correction of magnetic sensor |
| 1 | Set the origin of rotation shaft at an arbitrary position, and designate the origin of rotation angle as $\theta r'$. |
| 2 | Measure $\theta r'$ and $\theta m$ while rotating the rotor at a constant speed. Calculate the difference $\delta' = \theta m - \theta r'$. |
| 3 | Calculate a weighed average of $\delta'$ with respect to $\theta r'$, and designate the average as $\delta'{av}$. |
| 4 | Reconfigure the rotation-axis coordinate according to $\theta r = \theta r' - \delta'{av}$. |
| 5 | Set the rotation shaft at $\theta r = 0$, and correct the offset of SIN bridge of magnetic sensor. |
| 6 | Set the rotation shaft at $\theta r = 90°$, and correct the offset of COS bridge of magnetic sensor. |
| 7 | End of correction procedure of rotational angle measurement apparatus : $|\delta| \leq 1°$ |

FIG.11A

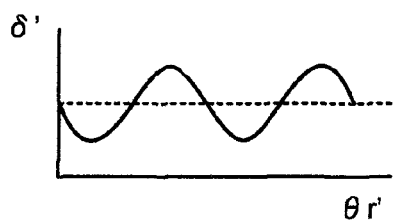

FIG.11B

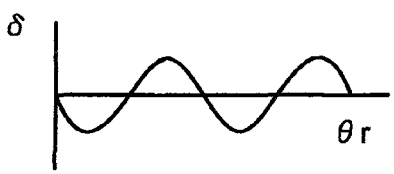

ROTATIONAL ANGLE-MEASUREMENT APPARATUS AND ROTATIONAL SPEED-MEASUREMENT APPARATUS

INCORPORATION BY REFERENCE

The present application claims priority from Japanese Patent Application JP2009-144863 filed on Jun. 18, 2009, the content of which is hereby incorporated by reference into this application.

BACKGROUND OF THE INVENTION

This invention relates to a rotational angle-measurement apparatus using magneto-resistance elements (hereafter referred to also as MR elements).

Such a rotational angle-measurement apparatus as using MR elements is disclosed in, for example, JP-3799270.

As MR elements are known anisotropic magneto-resistance elements (hereafter referred to as AMR elements) and giant magneto-resistance elements (hereafter referred to as GMR elements). The general idea of the related, conventional art will be described below with a magnetic field detection apparatus using GMR elements taken as an example.

FIG. 2 shows the fundamental structure of a GMR element. The GMR element comprises a first magnetic layer (pinned magnetic layer), a second magnetic layer (free magnetic layer) and a non-magnetic layer (spacer layer) interposed between the first and second magnetic layers. When the GMR element is placed in an external magnetic field, the magnetization direction 20 in the free magnetic layer changes depending on the orientation of the external magnetic field while the magnetization direction in the pinned magnetic layer remains unchanged.

When a voltage is applied across the GMR element, current flows in accordance with the element resistance. The element resistance varies depending on the difference $\Delta\theta=\theta_f-\theta_p$ between the magnetization direction $\theta_p$ of the pinned magnetic layer and the magnetization direction $\theta_f$ of the free magnetic layer. Accordingly, if the magnetization direction $\theta_p$ of the pinned magnetic layer is previously known, the magnetization direction $\theta_f$ of the free magnetic layer, i.e. the orientation of the external magnetic field, can be detected by measuring the resistance of the GMR element and using the above difference relationship.

The mechanism of the resistance of the GMR element changing according to the relationship $\Delta\theta=\theta_f-\theta_p$ is as follows.

The magnetization direction in a thin-film magnetic film is related to the direction of electron spin in the magnetic film. Accordingly, if $\Delta\theta=0$, the spin direction of a majority of electrons in the free magnetic layer tends to coincide with the spin direction of a majority of electrons in the pinned magnetic layer. On the other hand, if $\Delta\theta=180°$, the spin direction of a majority of electrons in the free magnetic layer tends to be opposed to the spin direction of a majority of electrons in the pinned magnetic layer.

FIGS. 3A and 3B schematically show in cross-section a free magnetic layer 11, a spacer layer 12 and a pinned magnetic layer 13. Arrows in the free magnetic layer 11 and the pinned magnetic layer 13 indicate the spin directions of the majority electrons. FIG. 3A shows the case where $\Delta\theta=0$, that is, the spin direction of the free magnetic layer 11 coincides with that of the pinned magnetic layer 13. FIG. 3B shows the case where $\Delta\theta=180°$, that is, the spin direction of the free magnetic layer 11 is opposite to that of the pinned magnetic layer 13. In case of $\Delta\theta=0$, as shown in FIG. 3A, electrons having the spin direction to the right, issued from the pinned magnetic layer 13, are scattered less frequently in the free magnetic layer 11 whose majority electrons have the spin direction to the right, traveling along such a path as an electron trajectory 810. On the other hand, in case of $\Delta\theta=180°$, as shown in FIG. 3B, electrons having the spin direction to the right, issued from the pinned magnetic layer 13, are scattered more frequently in the free magnetic layer 11 whose majority electrons have the spin direction to the left, traveling along such a path as an electron trajectory 810. In this way, if $\Delta\theta=180°$, electron scattering is considerable so that the electric resistance in the GMR element increases.

In the intermediate case of $\Delta\theta=0\sim180°$, the electron trajectory becomes somewhat intermediate between those shown in FIGS. 3A and 3B. The resistance of the GMR element is known to be represented by the following expression.

[Expression 1]

$$R = R'_0 + \frac{G}{2}(1 - \cos\Delta\theta) = R_0 - \frac{G}{2}\cos\Delta\theta \quad (1)$$

Here, G/R is called the GMR coefficient, having a value of several to several tens of percent.

As described above, since electric current (therefore, electric resistance) through the GMR element can be controlled depending on the direction of electron spin, the GMR element is also called a spin-valve device.

Moreover, with a magnetic film having a small film thickness (thin-film magnetic films), since the demagnetizing factor in the normal direction with respect to the surface is extremely large, the magnetization vector cannot rise up in the normal direction (direction of film thickness) and remains recumbent in the plane of the surface. Since each of the free magnetic layer 11 and the pinned magnetic layer 13, which constitute the GMR element, is sufficiently thin so that the magnetization vectors of the layers 11 and 13 lie in their planes.

In a magnetic field detection apparatus, four GMR elements $R_1$ (51-1)~$R_4$ (51-4) constitute a Wheatstone bridge as shown in FIG. 4. Here, let it be assumed that the magnetization direction in the pinned magnetic layers of the GNR elements $R_1$ (51-1) and $R_3$ (51-3) is given by $\theta_p=0$ while that of the GNR elements $R_2$ (51-2) and $R_4$ (51-4) is given by $\theta_p=180°$. Since the magnetization directions in the free magnetic layers of the four GMR elements are determined depending on the orientation of the external magnetic field, they become the same as one another. It therefore holds that $\Delta\theta_2=\theta_f-\theta_{p2}=\theta_f-\theta_{p1}-\pi=\Delta\theta_1+\pi$. Here, since $\Delta\theta_1$ is set with $\theta_p=0$ as reference, the replacement $\Delta\theta_1=0$ is introduced. Accordingly, as apparent from the expression (1), it follows that for $R_1$ and $R_3$ (n=1, 3):

[Expression 2]

$$R_n = R_{n0} + \frac{G}{2}(1 - \cos\theta) \quad (2)$$

And it follows that for $R_2$ and $R_4$ (n=2, 4):

[Expression 3]

$$R_n = R_{n0} + \frac{G}{2}(1 + \cos\theta) \quad (3)$$

When an excitation voltage $e_0$ is applied to the bridge shown in FIG. 4, the difference voltage $\Delta V = V_2 - V_1$ between the terminals 1 and 2 is given by the following expression.

[Expression 4]

$$\Delta v = \frac{R_1 R_3 - R_2 R_4}{(R_1 + R_4)(R_2 + R_3)} e_0 \qquad (4)$$

If the expressions (2) and (3) are substituted for the expression (4), if it is assumed that $R_{n0}$'s are equal to one another for $n=1\sim4$, and that $R_0 = R_{n0}$, then it follows that:

[Expression 5]

$$\Delta v = \frac{-e_0 G \cos\theta}{2 R_0} \qquad (5)$$

In this way, since the signal voltage $\Delta V$ is proportional to $\cos\theta$, the orientation of magnetic field can be detected.

Thus, the magneto-resistance element is characterized in that it can directly measure the orientation of magnetic field.

There is known a rotational angle-measurement apparatus using a resolver and such is disclosed in JP-A-2008-11661. As disclosed in JP-A-2008-11661, the resolver measures the change in the inductance along the closed path: stator coil~rotor core~stator coil. By appropriately designing the shape of the rotor core, the length of the air gap between the rotor core and the stator can be made variable depending on the rotational angle of the rotor. Hence, the inductance changes accordingly. Therefore, the rotational angle of the rotor core can be measured by measuring the change in the inductance.

In this way, with a rotational angle sensor the typical example of which is a resolver, that measures inductance, the accuracy of air gap affects the accuracy in angle measurement so that high accuracy is required in fabrication and assembling. Moreover, increase in the diameter of the rotor shaft causes increase in the size of the resolver. This results in a problem of cost increase.

On the other hand, the size of a magneto-resistance element such as a GMR element is a square having its side of a few millimeters or less. It therefore can be said to be of small size and light weight. Moreover, since the magneto-resistance element detects the orientation of magnetic field, a small-sized sensor can be used even if a thick rotor shaft is used.

Accordingly, if it is desired to build a small-sized rotational angle-measurement apparatus, the use of magneto-resistance elements can advantageously provide a desirable apparatus of smaller size and lighter weight. Further, if it is desired to control an electric motor of large rating, the use of magneto-resistance elements can advantageously provide a low-cost rotational angle-measurement apparatus.

SUMMARY OF THE INVENTION

There has hitherto been a problem that when a magnetic sensor is mounted in a conventional rotational angle-measurement apparatus using magneto-resistance elements, the mechanical alignment of the magnetic sensor is difficult.

Such a conventional rotational angle-measurement apparatus has hitherto suffered from a problem that when it is to be electrically corrected, an actuator/encoder for correction must be prepared and coupled to the apparatus.

Further, the above problems have also led to another problem that correction is difficult if it is attempted after a rotational angle-measurement apparatus has been incorporated in a system, and another problem that if the rotational angle-measurement apparatus already incorporated in a system is replaced by a new one, the correction of the new apparatus is difficult, that is, the replacement of rotational angle-measurement apparatus is difficult in effect.

Moreover, a conventional rotational angle-measurement apparatus has a problem that if there is a magnetic substance or material of a high permeability in the vicinity of the conventional rotational angle-measurement apparatus, accuracy in the measurement of rotational angle is deteriorated.

Furthermore, a conventional rotational angle-measurement apparatus has a problem that if the distribution of magnetic field is changed in a complicated manner due to the existence of a magnetic substance or material of a high permeability in the vicinity of the conventional rotational angle-measurement apparatus, correction cannot be sufficiently performed.

Yet further, a conventional rotational angle-measurement apparatus has a problem that when it is built in a water-proof structure, the structure of the part through which the signal lead wires are drawn out becomes complicated so that the overall assemblage becomes complicated.

Still further, a conventional rotational angle-measurement apparatus has a problem that the calculation of rotational angle from the output of magnetic sensor requires considerable time so that the calculation of rotational angle cannot respond quickly enough to the measurement of rotational angle of the rotation shaft at high-speed operation.

According to this invention, which has been made to solve various problems mentioned above, there is provided a rotational angle-measurement apparatus whose correction can be electrically performed without resort to a correction encoder.

As a result, even after the apparatus has been installed in a system such as an automobile, it became possible to replace only the sensor proper. This is because the rotational angle-measurement apparatus proper can be corrected after its replacement.

This invention is summarized as some embodiments as follows.

One embodiment is a rotational angle-measurement apparatus which comprises an electric motor having a rotation shaft, a magnet mounted on one end of the rotation shaft, and a magnetic sensor whose output signal changes in accordance with the orientation of the magnetic field surrounding the magnetic sensor, and which outputs an angle signal representing the rotational angle of the rotation shaft, wherein the rotational angle-measurement apparatus has a procedure of correction, in which the rotation shaft of the electric motor is rotated through more than one revolution at a rotational speed whose rate of change with time is known so that the angle signal can be corrected.

Another embodiment is a rotational angle-measurement apparatus which comprises an electric motor having a rotation shaft, a magnet mounted on one end of the rotation shaft, and a magnetic sensor whose output signal changes in accordance with the orientation of the magnetic field surrounding the magnetic sensor, and which outputs an angle signal representing the rotational angle of the rotation shaft, wherein the electric motor, the rotation shaft and the magnet are covered by a chassis; the magnetic sensor is disposed outside the chassis; the chassis has a chassis main body covering the electric motor and a chassis housing unit covering the magnet; the chassis housing unit is made of material having magnetic susceptibility of 0.01 or less; and wherein the rotational angle-measurement apparatus has a procedure of correction, in which the rotation shaft of the electric motor is rotated through more than one revolution at a rotational speed whose rate of change with time is known so that the angle signal can be corrected.

Yet another embodiment is a rotational angle-measurement apparatus which comprises an electric motor having a rotation shaft, a magnet mounted on one end of the rotation shaft, and a magnetic sensor whose output signal changes in accordance with the orientation of the magnetic field surrounding the magnetic sensor, and which outputs an angle signal representing the rotational angle of the rotation shaft, wherein the electric motor, the rotation shaft and the magnet are covered by a chassis; the magnetic sensor is disposed outside the chassis; the chassis has a chassis main body covering the electric motor and a chassis housing unit covering the magnet; the chassis housing unit is made of material having magnetic susceptibility of 0.01 or less; the chassis housing unit and the magnetic sensor are covered with a shielding component; and the shielding component is made of material having magnetic susceptibility of 1000 or more.

Still another embodiment is a rotational angle-measurement apparatus which comprises an electric motor having a rotation shaft, a magnet mounted on one end of the rotation shaft, and a magnetic sensor whose output signal changes in accordance with the orientation of the magnetic field surrounding the magnetic sensor, and which outputs an angle signal representing the rotational angle of the rotation shaft, wherein the electric motor, the rotation shaft and the magnet are covered by a chassis; the magnetic sensor is disposed outside the chassis; the chassis has a chassis main body covering the electric motor and a chassis housing unit covering the magnet; the chassis housing unit is made of metal having magnetic susceptibility of 0.01 or less; and the thickness t (m) of that part of the chassis housing unit which is between the magnet and the magnetic sensor is given by the inequality:

$$t \leq 257 \sqrt{\frac{\rho}{N_p f (1+\chi)}},$$

where $N_p$ is half the number of the magnetic poles of the magnet, f (Hz) is the maximum rotational frequency of the rotation shaft, $\chi$ is the magnetic susceptibility of the chassis housing unit, and $\rho$ ($\Omega$m) is the resistivity of the chassis housing unit.

Still another embodiment is a rotational speed-measurement apparatus which comprises an electric motor having a rotation shaft, a magnet mounted on one end of the rotation shaft, and a magnetic sensor whose output signal changes in accordance with the orientation of the magnetic field surrounding the magnetic sensor, and which outputs an angle signal representing the rotational angle of the rotation shaft, wherein the magnetic sensor has a first bridge that outputs a first signal proportional to the cosine of the rotational angle of the rotation shaft and a second bridge that outputs a second signal proportional to the sine of the rotational angle of the rotation shaft; and the speed signal is calculated from the ratio of the time-derivative of the first signal to the second signal.

Still another embodiment is a rotational angle-measurement apparatus which comprises an electric motor having a rotation shaft, a magnet mounted on one end of the rotation shaft, and a magnetic sensor whose output signal changes in accordance with the orientation of the magnetic field surrounding the magnetic sensor, and which outputs an angle signal representing the rotational angle of the rotation shaft, wherein the magnetic sensor has a first bridge that outputs a first signal proportional to the cosine of the rotational angle of the rotation shaft and a second bridge that outputs a second signal proportional to the sine of the rotational angle of the rotation shaft; a first intermediate signal is defined as the ratio of the time-derivative of the first signal to the second signal; a second intermediate signal is defined as the ratio of the time-derivative of the second signal to the first signal; and a fault-detection signal is outputted when the difference of the first intermediate signal from the second intermediate signal exceeds a preset range of values.

As described above, according to this invention, the correction of a rotational angle-measurement apparatus can be performed without using an actuator/encoder for correction.

As a result, even after the apparatus has been installed in a system such as an automobile, it became possible to replace only the sensor proper. This is because the rotational angle-measurement apparatus proper can be corrected after its replacement.

According to this invention, measurement of angles with high accuracy becomes possible even in a system where a magnetic substance or material of a high permeability exists in the vicinity of the rotational angle-measurement apparatus.

According to this invention, a rotational angle-measurement apparatus can be realized which is sufficiently responsive to, that is, able to follow up high-speed rotations.

According to this invention, reliability can be enhanced by issuing a fault-detection signal when an abnormal condition occurs in a rotational angle-measurement apparatus or a rotational speed-measurement apparatus.

Other objects, features and advantages of the invention will become apparent from the following description of the embodiments of the invention taken in conjunction with the accompanying drawings.

BRIEF DESCRIPTION OF THE DRAWINGS

FIG. 10 illustrates the procedure for offsetting the magnetic sensor used in the first embodiment of this invention;

FIGS. 11A and 11B are a picture used for describing the procedure for adjusting the angular origin in the first embodiment of this invention;

DETAILED DESCRIPTION OF THE EMBODIMENTS

This invention will now be described in detail below in reference to the attached drawings which show embodiments of this invention. First, the first embodiment of a magnetic field detection apparatus according to this invention is exemplified as a magnetic field detection apparatus composed of giant magneto-resistance (GMR) elements.

Figure 5:
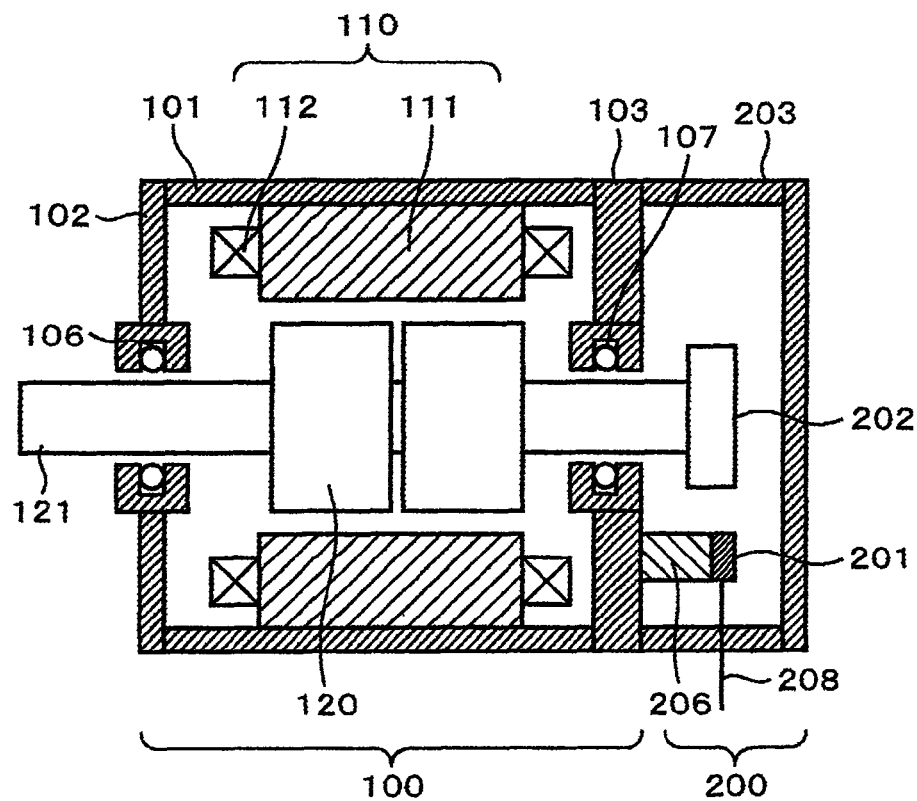
FIG. 5 is a cross-sectional view of a rotational angle-measurement apparatus as the first embodiment of this invention.

FIG. 5 shows a first embodiment of a rotational angle-measurement apparatus according to this invention.

FIG. 5 is a cross-sectional view of a rotational angle-measurement apparatus as the first embodiment of this invention. This embodiment comprises a motor unit 100 and a rotational angle-measurement unit 200.

The motor unit 100 comprises a stator 110 consisting mainly of plural fixed magnetic poles and a rotor 120 consisting mainly of plural rotatable magnetic poles. In this motor unit 100, rotational torque is generated through magnetic interaction between the plural fixed magnetic poles and the plural rotatable magnetic poles being rotating. The stator 110 comprises a stator core 111 and a stator coil 112 wound around the stator core 111. The rotor 120 is disposed within the inner cylindrical surface of the stator 110, with an air gap interposed between them, and rotatably supported. In this embodiment, the motor 100 is exemplified as a three-phase AC synchronous motor of surface permanent magnet type.

A chassis comprises a cylindrical frame 101, a first bracket 102 and a second bracket 103, the brackets 102 and 103 being provided at both ends along the axial direction of the frame 101. Bearings 106 and 107 are provided in the hollows of the first and second brackets 102 and 103, respectively. These bearings rotatably support a rotation shaft 121.

Between the flame 100 and the first bracket 102 is provided a sealant (not shown), which is an annularly shaped O-ring that is compressed in the axial and redial directions between the frame 101 and the first bracket 102. In this way, tight seal is provided between the frame 101 and the first bracket 102 so that the front end of the motor chassis can be water-proofed. In like manner, a sealant (not shown) tightly seals the frame 101 and the second bracket 103.

The stator 110 comprises the stator core 111 and the stator coil 112 wound around the stator core 111, and is disposed on the internal surface of the frame 101. The stator core 111 is of magnetic material (magnetic path formation body), built with silicon steel sheets laminated in the axial direction. The thus assembled stator core 111 consists of an annular back-core and plural teeth, each of which rises from the internal surface of the annular back-core radially and internally. The teeth are equally spaced apart from one another in the circumferential direction.

Winding conductors constituting the stator coil 112 are wound around the respective teeth in the fashion of concentrated winding. The winding conductors constitute three-phase windings by appropriately connecting the coil ends with connecting members located near the second bracket 103. The well-known two ways of connection of three-phase windings are the delta (Δ) connection and the star (Y) connection. In this embodiment, the delta (Δ) connection is employed.

The rotor 120 comprises a rotor core fixedly mounted on outer peripheral surface of the rotation shaft 121, plural magnets fixedly disposed on the outer surface of the rotor core, and magnet covers 122a and 122b disposed on the outer periphery of the magnets. The magnet covers 122 serves to prevent the magnets from flying away from the rotor core due to centrifugal force, and therefore are made of non-magnetic material such as stainless steel (known as SUS) and cylindrical or tubular in structure. (Note that the reference numerals 122, 122a and 122b are not shown in FIG. 5.)

The structure of the rotational angle-measurement unit 200 will now be described.

The rotational angle-measurement unit 200 consists mainly of a magnetic sensor 201 and a sensor magnet 202. The rotational angle-measurement unit 200 is located in the space enclosed by a housing 203 and the second bracket 103. The sensor magnet 202 is mounted on one end of the rotation shaft 121 of the motor unit 100 and when the angular position of the rotation shaft 121 changes, the orientation of the magnetic field generated by the sensor magnet 202 changes accordingly. The rotation angle (i. e. angular position) of the rotation shaft 121 can be measured by detecting the orientation of the magnetic field with the magnetic sensor 201.

The sensor magnet 202 may be a two-pole magnet that is magnetized in 2-pole form or a multipole magnet that is magnetized in multipole (more than four pole) form.

The magnetic sensor 201 is built with magneto-resistance elements, the output of which changes in response to the orientation of the sensed magnetic field. Magneto-resistance elements include anisotropic magneto-resistance (AMR) elements, giant magneto-resistance (GMR) elements and tunneling magneto-resistance (TMR) elements. In this embodiment, giant magneto-resistance (GMR) elements are used for the magnetic sensor 201.

The magnetic sensor 201 detects the orientation $\theta_m$ of the magnetic field at the position where the sensor 201 is located, on the basis of the reference angle $\theta_{m0}$ assigned to the sensor 201. Namely, the sensor 201 outputs a signal expressed as $\theta=\theta_m-\theta_{m0}$. The magnetic sensor 201 used in this embodiment consists of two GMR elements, and the GMR elements deliver output signals proportional to $\cos(\theta_m-\theta_{m0})$ and $\sin(\theta_m-\theta_{m0})$, respectively.

The magnetic sensor 201 is fixedly attached to the second bracket 103 by means of a sensor supporting component 206. The sensor supporting component 206 is preferably made of material having magnetic susceptibility not greater than 0.1, such as aluminum or resin so as not to influence the orientation of nearby magnetic field. In this embodiment, the sensor supporting component 206 was made of aluminum.

It suffices that the magnetic sensor 201 is immobile relative to the motor unit 100, and therefore it may be fixedly attached to a structural part other than the second bracket 103. For, if it is immobile relative to the motor unit, it can detect the rotational angle of the rotation shaft 121 by detecting the orientation of the magnetic field at its position in space as the rotation angle of the shaft 121 changes to change the orientation of the sensor magnet 202.

Sensor wiring 208 is connected with the magnetic sensor 201. The output of the sensor 201 is transferred via the sensor wiring 208.

The magnetic sensor 201 consists mainly of a sensor element unit 301 and a detection circuit unit 302. The sensor element unit 301 includes plural GMR elements connected in bridge configuration. The detection circuit unit 302 consists mainly of a driving circuit unit for supplying voltages applied to the GMR elements and a signal processing unit for detecting and processing the output signals of the GMR elements.

The structure of the sensor element unit 301 will now be described.

Figure 24:
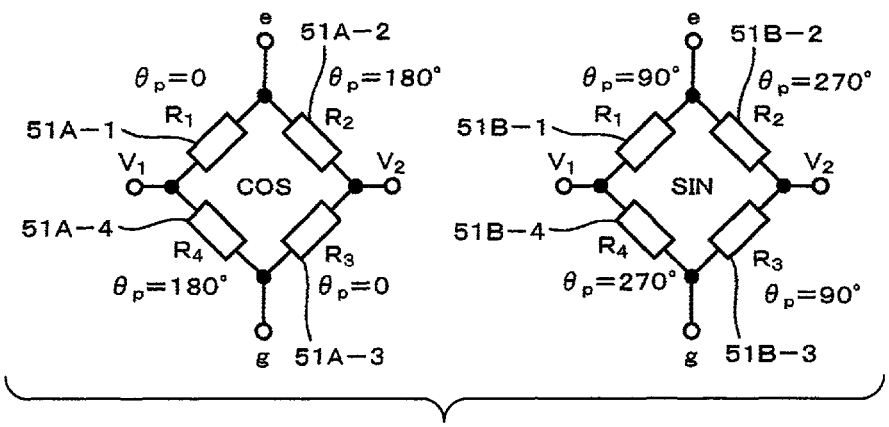
FIG. 24 schematically shows the structure of the sensor element unit used in the first embodiment of this invention.

As shown in FIG. 24, the sensor element unit 301 consists of a pair of bridge configurations composed of GMR elements 51. The bridge configurations are named COS bridge and SIN bridge, respectively. The COS bridge and SIN bridge differ from each other in the orientation $\theta_p$ of the magnetization in the pinned magnetic layers of the GMR elements. For the COS bridge, the presetting is such that $\theta_p=0°$ ($R_1$ (51A-1) and $R_3$ (51A-3)) and $\theta_p=180°$ ($R_2$ (51A-2) and $R_3$ (51A-4)). Accordingly, if the angular origin of the orientation $\theta$ of magnetic field is preset such that $\theta_p=0$, the output signal voltage $\Delta V=V_2-V_1$ becomes proportional to $\cos \theta$ as described above.

[Expression 6]

$$\Delta V_c = V_2 - V_1 = -e_0 \frac{G}{2R} \cos\theta \tag{6}$$

Here, $e_0$ is the voltage applied to the terminals e of the bridges shown in FIG. 24, and called the "bridge excitation voltage". For SIN bridge, on the other hand, the orientation $\theta_p$ of the magnetization in the pinned magnetic layers is preset such that $\theta_p=90°$ ($R_1$ (51B-1) and $R_3$ (51B-3)) and $\theta_p=270°$ ($R_2$ (51B-2) and $R_3$ (51B-4)). Accordingly, if the angular origin of the orientation $\theta$ of magnetic field is preset such that $\theta_p=0$, the output signal voltage $\Delta V=V_2-V_1$ becomes proportional to $\sin \theta$.

[Expression 7]

$$\Delta V_s = V_2 - V_1 = e_0 \frac{G}{2R} \sin\theta \tag{7}$$

As a result, the ratio of the SIN bridge output to the COS bridge output leads to $\tan \theta$ so that the orientation $\theta$ of magnetic field is determined such that

[Expression 8]

$$\theta = \text{ArcTan}\left(\frac{\Delta V_s}{-\Delta V_c}\right) \tag{8}$$

The Arc Tan function delivers its output only for the angular range of $-90°\sim+90°$. However, if the signs attached to $\Delta V_s$ and $\Delta V_c$ are adjusted appropriately as described below, the orientation $\theta$ of magnetic field can be measured over the entire angular range of $0\sim360°$.

The structure of the detection circuit unit 302 will now be described in reference to FIG. 25.

Figure 25:
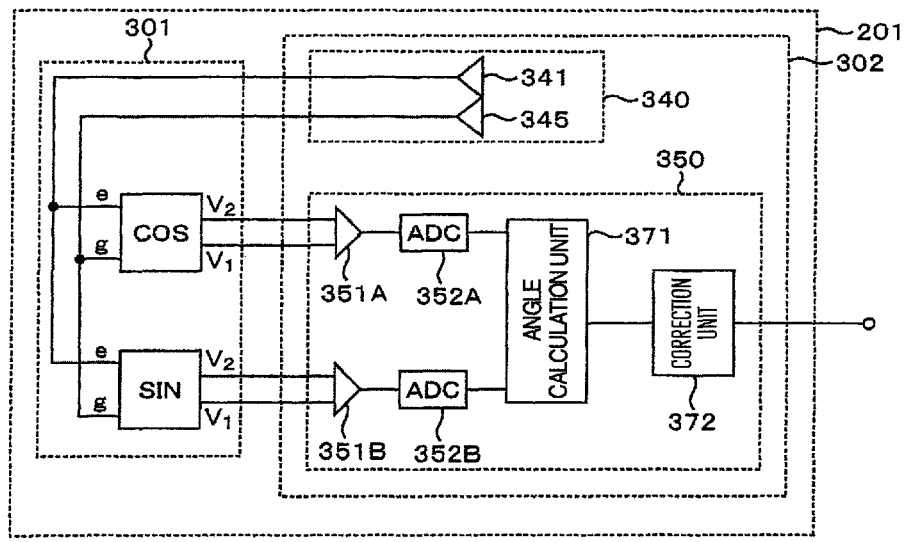
FIG. 25 schematically shows the structure of the magnetic sensor used in the first embodiment of this invention.

FIG. 25 is a block diagram of the structure of the detection circuit unit 302 used in this embodiment. The detection circuit unit 302 consists mainly of a driving circuit unit 340 and a signal processing unit 350. The driving circuit unit 340 is a circuit for supplying excitation voltages to the bridges included in the sensor element unit 301. A positive-polarity output unit 341 is connected with the terminals e of the bridges while a negative-polarity output unit 345 is connected with the terminals g of the bridges. In this embodiment, the positive-polarity output unit 341 is so designed as to output a DC voltage of 5V while the negative-polarity output unit 345 is so designed as to output the ground voltage.

It is noted here that the negative-polarity output unit 345 does not necessarily deliver a negative voltage as compared with the ground voltage although the negative-polarity output unit 345 is assigned the prefix "negative-polarity" in the sense that it outputs a voltage more negative than the output voltage of the positive-polarity output unit 341.

During the period for which the GMR bridges are not excited, that is, during the time for which the sensor output corresponding to the field orientation $\theta_m$ is not obtained, it is not required to determine whether the output of the negative-polarity output unit is more negative or positive than the output of the positive-polarity output unit. For example, in an embodiment described below, during the period for which the bridges of GMR elements are not excited, the output voltage of the negative-polarity output unit is made equal to the output voltage of the positive-polarity output unit.

The signal processing unit 350 detects and processes the output signal of the sensor element unit 301. The signals out of terminals V2 and V1 of the COS bridge of the sensor element unit 301 are deferentially detected and amplified about 10 times by a detection circuit 351A. An AD (analog to digital) converter 352A converts the amplified signal to a digital signal, which is then inputted into an angle calculation unit 371. The output signal of the SIN bridge is similarly processed and inputted into the angle calculation unit 371.

The calculation process of the angle calculation unit 371 will be described below. As understood from the Expression 8, the field orientation $\theta_m$ can be obtained by calculating Arc Tan$[\Delta V_s/(-\Delta V_c)]$. In doing this, however, two problems occur: (a) first, since Arc Tan function can only be evaluated for the angular range of $-90°\sim+90°$, the field orientation cannot be measured over the entire angular range of $0\sim360°$, and (b) secondly, since the decrease in the absolute value of $\Delta V_c$ leads to the increase in the influence by the measurement inaccuracy of $\Delta V_c$, the calculation accuracy of $\theta$ becomes poor.

In order to cope with the above problem (b), the angle calculation unit 371 obtains $\theta$ in the following manner. To begin with, it is determined whether or not the absolute value of $\Delta V_c$ is greater than the absolute value of $\Delta V_s$. If $|\Delta V_c|$ is greater than $|\Delta V_s|$, the field orientation $\theta$ is calculated by the following expression (9).

[Expression 9]

$$\theta = \text{ArcTan}\left(\frac{\Delta V_s}{-\Delta V_c}\right) \quad (9)$$

Conversely, if $|\Delta V_c|$ is smaller than $|\Delta V_s|$, the field orientation $\theta$ is calculated by the following expression (10).

[Expression 10]

$$\theta = \text{ArcCot}\left(\frac{-\Delta V_c}{\Delta V_s}\right) \quad (10)$$

In this way, calculation inaccuracy resulting from the denominator becoming smaller can be prevented from becoming large.

The above problem (a) is handled as follows. The quadrant in which $\theta$ falls is determined depending on whether $\Delta V_c$, or $\Delta V_s$ takes a negative or positive value [quadrant determination]. The combination of the determined quadrant with the values calculated by the expressions (9) and (10) enables the accurate value of $\theta$ to be calculated over the range of $0\sim360°$.

Through the above described procedure, the orientation $\theta$ of magnetic field is obtained. However, as will be described later, the rotational angle of the rotation shaft 121 and the magnetic field orientation (or angle) do not necessarily coincide with each other. Hereinafter in this specification, in order to strictly discriminate between them, the orientation (or angle) of magnetic field is referred to as "magnetic field angle $\theta_m$" whereas the rotational angle of the rotation shaft 121 is termed "rotor angle $\theta_r$".

As will be described later, with a rotational angle-measurement apparatus, it is essentially important to discriminate between the magnetic field angle $\theta_m$ and the rotor angle $\theta_r$.

Also, in order to realize a rotational angle-measurement apparatus with high accuracy, it is necessary to make the magnetic field angle $\theta_m$ correspond exactly to the rotor angle $\theta_r$. How to do this will be described below.

Now, the method for correcting the output signal of the magnetic sensor 201 will be described.

The size of the magnetic sensor 201 using magneto-resistance elements is smaller than that of a resolver, and typically in the order of 5 mm square. Accordingly, there occurs a problem that since the size of the magnetic sensor is small, mount inaccuracy enhances angle inaccuracy. A concrete description will be made below.

Figure 6:
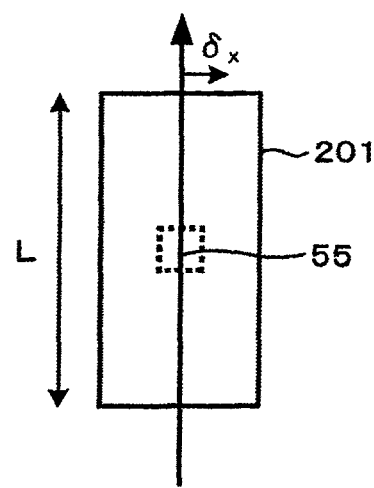
FIG. 6 is a picture used for describing the relationship between the size of magnetic sensor and the mount inaccuracy.

In reference to FIG. 6, let it be assumed that in case of a magnetic sensor having a length of L [mm] being mounted, the amount inaccuracy in the direction perpendicular to the direction along the length L be denoted as $\delta x$ [mm]. In the following discussion, generality can be maintained if the reference angle $\theta_{m0}$ is in the direction of the length L. As a result, the inaccuracy $\delta\theta$ in mount angle due to mount inaccuracy $\delta x$ can be given by the following expression.

[Expression 11]

$$\delta\theta_m = \text{ArcTan}\left(\frac{\delta x}{L}\right) \approx \frac{\delta x}{L} \quad (11)$$

Therefore, it happens that an inaccuracy of $\delta\theta_m$ is contained in the rotational angle indicated by the magnetic field angle-measurement apparatus.

Typically, the mount inaccuracy $\delta x$ to be mechanically caused for the magnetic sensor is 0.2 mm. If the length L of the magnetic sensor is equal to 100 mm, the corresponding angular inaccuracy $\delta\theta_m$ becomes 0.1°. This value falls within a tolerable range of inaccuracy. On the other hand, in case of L=5 mm, the corresponding angular inaccuracy $\delta\theta_m$ becomes 2.3°. This result indicates that the magnetic field angle-measurement apparatus being in use is poor in accuracy.

It is possible that the module length L of a magnetic sensor 201 is made as long as about 100 mm so as to increase the tolerable range of mount inaccuracy. Even in such a case, however, a mount inaccuracy corresponding to the above mentioned $\delta x$ is caused in the process of mounting the magneto-resistance element bridge 55 in the module, and in the processes of wire bonding and molding. Since the size of the magneto-resistance element bridge 44 in the module is still smaller, the influence by the angular inaccuracy due to $\delta x$ becomes larger accordingly.

Further, there is still a problem that the increase in the size of module is indeed advantageous in that the tolerance of mount inaccuracy can be increased, but does not lead to the merit that the magnetic sensor built with magneto-resistance elements can be of small size and light weight.

The angle $\theta_m$ of the magnetic field generated by the sensor magnet 202 is not necessarily coincident with the rotational angle $\theta_r$ of the rotation shaft 121. The reasons for this fall into three categories given below: (1) the origin (zero point) of the magnetic field angle $\theta_m$ does not coincide with the origin of the rotational angle $\theta$ of the rotation shaft 121; (2) the magnetic field generated by the sensor magnet 202 does not distribute parallelly; and (3) the sensor magnet 202 is not accurately magnetized.

The first reason that (1) the origin (zero point) of the magnetic field angle $\theta_m$ does not coincide with the origin of the rotational angle $\theta_r$ of the rotation shaft 121, can be ascribed to the inaccuracies incurred in mounting the magnetic sensor and the mechanical inaccuracies caused in mounting the sensor magnet 202 onto the rotation shaft 121. The method for making these two origins coincident with each other will be described later. Here is considered a case where the origins for $\theta_m$ and $\theta_r$ are coincident with each other.

Figure 7:
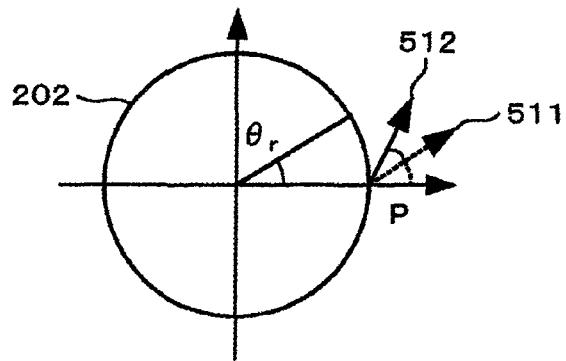
FIG. 7 diagrammatically shows the relationship between magnetic field angle and rotor angle.

In case where (2) the sensor magnet 202 generates parallel magnetic field, the magnetic field angle $\theta_m$ coincides with the rotational angle $\theta_r$ of the rotation shaft. However, in case where the sensor magnet does not generate parallel magnetic field, $\theta_m$ deviates from $\theta_r$. This situation is described in reference to FIG. 7. FIG. 7 is a pictorial representation of the magnetic field angle at point P which is located in the vicinity of the sensor magnet 202 and at which the magnetic field sensor 201 is located. Now, if the sensor magnet generates parallel magnetic field, the magnetic field angle at point P is as indicated by a dotted arrow 511 when the sensor magnet 202 rotates through an angle of $\theta_r$. Accordingly, the magnetic field angle $\theta_m$ becomes equal to the rotational angle $\theta_r$ of the sensor magnet 202. On the other hand, if the sensor magnet does not generate parallel magnetic field, the magnetic field angle $\theta_m$ at point P deviates from the rotational angle $\theta_r$ as indicated by a solid arrow 512. This deviation is defined as the difference $\delta$ such that $\delta = \theta - \theta_r$.

In general, magnetic field leaking from a magnet in the radial direction is not parallel field. For example, as disclosed in JP-A-2008-151774, the radial component $H_r$ and the tangential component $H_\theta$ of the magnetic field intensity vector measured in the plane of the rotation of the magnet are represented respectively by the following expressions:

[Expression 12]

$$H_r(\theta) = C(A_1 \cos\theta + A_3 \cos 3\theta + A_5 \cos 5\theta + \ldots) \quad (12)$$

[Expression 13]

$$H_\theta(\theta) = A_1 \sin\theta + A_3 \sin 3\theta + A_5 \sin 5\theta + \ldots \quad (13)$$

Here, C is a constant equal to about 1~2. In case where harmonics components $A_3$ and $A_5$ are both equal to zero, i.e. $A_3 = A_5 = 0$, and where C=1, $H_r = A_1 \cos\theta$ and $H_\theta = A_1 \sin\theta$, giving the condition for parallel magnetic field. In such a case, the magnetic field angle $\theta_m$ becomes coincident with the rotational angle $\theta_r$ of the rotation shaft.

Here, the difference $\delta$ of the magnetic field angle $\theta_m$ from the rotational angle $\theta_r$ of the rotation shaft is defined by the following expression:

[Expression 14]

$$\delta = \theta_m - \theta_r \quad (14)$$

Figure 8:
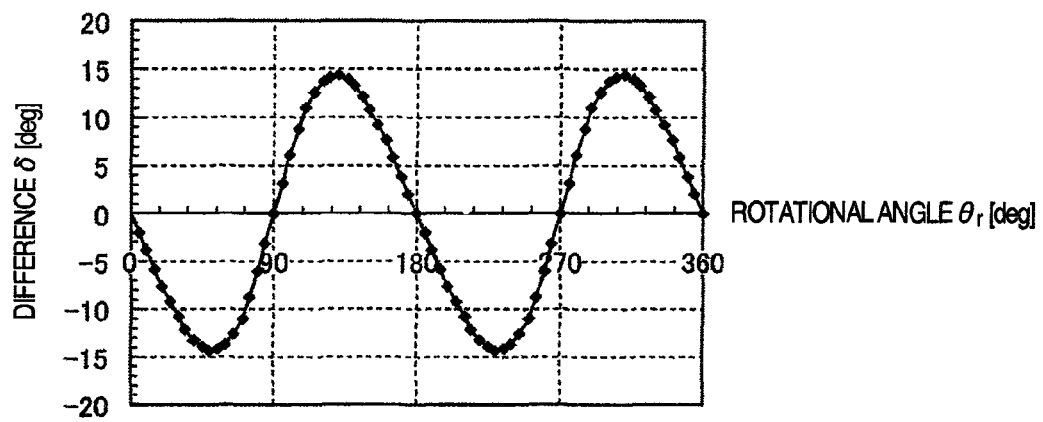
FIG. 8 graphically shows the difference $\delta$ between magnetic field angle and rotor angle.

FIG. 8 graphically shows the relationship between the difference $\delta$ of the magnetic field angle $\theta_m$ from the rotor angle $\theta_r$, and the rotor angle $\theta_r$, both $\theta_m$ and $\theta_r$ being calculated by using the above expressions (12) and (13) when $A_1 = 1$, $A_3 = -0.12$, $A_5 = 0.014$, and C=1.268. With this condition, the difference $\delta$ is about ±15° and these values are considered relatively large. Moreover, the difference $\delta$ changes depending on the rotor angle $\theta_r$ and it is understood that correction cannot be achieved by a simple method such as, for example, linear interpolation between 0° and 360°.

Figure 9:
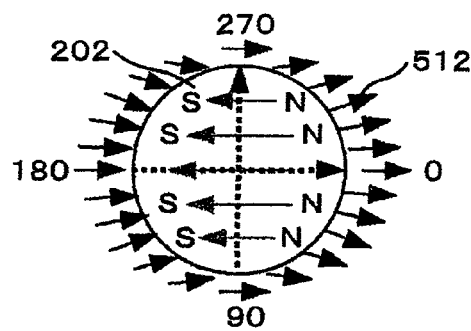
FIG. 9 is a picture illustrating the orientation of magnetic field on the outer periphery of a sensor magnet.

FIG. 9 schematically shows the distribution of the magnetic field angle in the vicinity of the sensor magnet 202, constructed on the basis of the distribution of the differences shown in FIG. 8. Thus, the distribution of the differences shown in FIG. 8 is attributed to the fact that the magnetic field diverges on the periphery of the sensor magnet. Also, the fact that the difference $\delta$ is reduced to zero at $\theta_r = 0°$, 90°, 180° and 270°, is ascribed to the symmetry of the magnetic field as apparent from FIG. 9.

If there is magnetization inaccuracy in magnetizing the sensor magnet, the correspondence of the rotational angle $\theta_r$ of the rotation shaft to the magnetic field angle $\theta_m$ becomes inaccurate.

[Method for Correcting a Rotational Angle-detection Apparatus]

As described with respect to the above reasons (1)~(3), the magnetic field detection apparatus using magneto-resistance elements must handle such physical quantity as the magnetic field angle $\theta_m$, and the physical quantity $\theta_m$ is different from the rotational angle $\theta_r$ of the sensor magnet. It is therefore important to recognize that difference may occur between them depending on a certain condition. In this specification, this difference is defined as $\delta$.

In other words, as long as the magnetic sensor 201 remains correct, it will measure the magnetic field angle $\theta_m$ correctly. Therefore, it is essential (a) to correct the magnetic field sensor 201 and (b) to correctly obtain the correspondence of the magnetic field angle $\theta_m$ to the rotational angle $\theta_r$ of the sensor magnet 202.

A concrete procedure for providing the above mentioned corrections will be described below.

First, as regards (a) correcting the magnetic sensor properly, offset correction is concretely important. It is to be noted here that there are two kinds of offsets: one is the offset for the magnetic sensor, attributed to the deviations of the characteristics of the magneto-resistance elements constituting the magnetic sensor 201; and the other is the offset for the detection circuit that detects and processes the output signal of the magnetic sensor.

In both the offset procedures, offset quantity is superposed on the output signal of the magnetic sensor. Accordingly, the ratio of the SIN bridge output to the COS bridge output will not be equal to tan $\theta$. As a result, the magnetic field angle $\theta_m$ cannot be correctly measured.

A concrete procedure for correcting offset is to adjust the offset of the SIN bridge output to zero at $\theta_m = 0$, and to adjust the offset of the COS bridge output to zero at $\theta_m = 90°$.

For this adjustment, it is necessary to know the origin for the magnetic field angle $\theta_m$. However, it is impossible to precisely locate the origin due to the mount inaccuracy of the magnetic sensor 201 or the mount/manufacturing inaccuracy of the sensor magnet 202 even if the correspondence of the magnetic field angle $\theta_m$ to the rotational angle $\theta_r$ of the rotation shaft is well known in the stage of design.

In this embodiment, the origin for the magnetic field angle will be obtained through a method described below. The method is itemized as a flow chart in FIG. 10.

To begin with, the origin for the rotational angle $\theta_r$ of the rotation shaft 121 is located at an arbitrary position. Then, let the rotational angle measured from the arbitrarily located origin be represented as $\theta_r'$.

Next, the rotation shaft 121 is rotated N-times at a constant speed. Here, N≧1. While the shaft is rotating, the relationship between the rotational angle $\theta_r'$ and the magnetic field angle $\theta_m$ is measured. Here, the value for the magnetic field angle $\theta_m$ is calculated from the output signal of the magnetic sensor 201. The value for the rotational angle $\theta_r$ is calculated through the actual measurement of time instant t. The way of measurement will be described in detail later.

In order to know the relationship between $\theta_r'$ and $\theta_m$ over the N rotations of the shaft, it is necessary to know the position of start of rotation and the position of end of rotation. The measurement of the magnetic field angle $\theta_m$ is employed to know this information. Namely, it suffices that measurement is continued until a value of $\theta_m$ that is the same as the value of $\theta_m$ assumed at the beginning of measurement is first reached. It is to be noted that for measurement to be performed over N rotations, it should be repeated until the same value for $\theta_m$ appears N times.

After the measurement of the relationship between $\theta_r'$ and $\theta_m$, difference $\delta'$ is calculated by the following expression.

[Expression 15]

$$\delta' = \theta_m - \theta_r' \quad (15)$$

In this way, the difference $\delta'$ can be obtained as a function of the rotational angle $\theta_r'$. FIG. 11A graphically shows this functional relationship.

As to the number of measurement data points $(\delta', \theta_r')$, it is sufficient to take about one hundred of them.

Next, the weighted average of $\delta'$ with respect to $\theta_r'$ is obtained as follows.

[Expression 16]

$$\delta'_{av} = \frac{\int \delta' d\theta_r'}{\int d\theta_r'} \quad (16)$$

Since the actual measurement data $(\delta', \theta_r')$ are of discrete nature, the integral calculation by the expression (16) is actually replaced by cumulative counting.

In this data sampling, the rotation shaft is rotated at a constant speed, and therefore when data $(\delta', \theta_r')$ are sampled at a regular time interval, the sample points with respect to $\theta_r'$ are equidistant. Hence, the expression (16) can be simplified as a formula for calculating the average of $\delta'$ as follows.

[Expression 17]

$$\delta'_{av} = \frac{\sum \delta'}{\text{number of data points}} \quad (17)$$

Therefore, it is preferable to rotate the rotation shaft at a constant speed and to sample the data points $(\delta', \theta_r')$ at a regular time interval.

Now, by using the values of $\delta'_{av}$ obtained by the expression (16) or (17), the coordinate point of rotational angle is redefined as follows.

[Expression 18]

$$\theta_r = \theta_r' - \delta'_{av} \quad (18)$$

[Expression 19]

$$\delta = \theta_m - \theta_r \quad (19)$$

With this definition, the relationship between $\delta$ and $\theta_r$ is as shown in FIG. 11B. Namely, the weighted average of $\delta$ vanishes. This is apparent from the expressions (6) and (7).

In this way, when the weighted average of difference $\delta$ is zero, the origin for $\theta_r$ coincides with the origin for $\theta_m$. This result is due to the symmetry of magnetic field distribution as shown in FIG. 9.

Now, the rotation shaft is halted at rotational angle $\theta_r = \theta_m = 0$, and offset adjustment is made in such a manner that the output signal of the SIN bridge in the magnetic sensor 201 vanishes. Then, the rotation shaft is halted at rotational angle $\theta_r = 90°$, and offset adjustment is made in such a manner that the output signal of the COS bridge in the magnetic sensor vanishes.

In this way, the offset adjustment of the magnetic sensor 201 is finished.

As apparent from the foregoing description, it is important to obtain $\delta_{av}'$ as accurately as possible in order to make the difference between the origin for $\theta_m$ and the origin for $\theta_r$ approach to zero. According to this method, since the value of $\delta_{av}'$ is calculated by using all measurement data points, as apparent from the expression (6) or (7), the calculated value is hardly affected by individual measurement inaccuracies and noise in measurement. Thus, the two origins can be made almost coincident with each other.

Further, since the increase in the rotation number N of the rotation shaft results in the increase in the number of measurement data points, the influence of measurement inaccuracies and noise is reduced to improve accuracy.

Next, a method for (b) correctly obtaining the relationship between the magnetic field angle $\theta_m$ and the rotational angle $\theta_r$ of the sensor magnet 202, will be described below.

Since the offset adjustment of the magnetic sensor 201 has been finished according to the method mentioned above as (a), the magnetic field angle $\theta_m$ obtained from the output signal of the magnetic sensor 201 correctly indicates the orientation of magnetic field at the position where the magnetic sensor 201 is located. Accordingly, the rotational angle $\theta_r$ can be obtained on the basis of the difference $\delta$ defined by the expression (14) and the magnetic field angle $\theta_m$, by using the following expression.

[Expression 20]

$$\theta_r = \theta_m - \delta \quad (20)$$

A concrete method will now be described below.

While the rotation shaft 121 is rotated through 360 degrees or more at a constant speed, the rotational angle $\theta_r$ and the magnetic field angle $\theta_m$ are measured during this one-revolution period. Here, the rotational angle $\theta_r$ is calculated on the basis of time whereas the magnetic field angle $\theta_m$ is calculated on the basis of the output signal of the magnetic sensors 201.

In this embodiment, 100 data points of measurement (i.e. sampling points) are taken for one revolution of the shaft. The greater is the number of sampling points, the higher is the accuracy of the obtained rotational angle $\theta_r$. On the other hand, the greater is the number of sampling points, the more is consumed the memory area in the signal processing circuit that executes calculations for correction. Therefore, the number of sampling points should be set to an appropriate value to make compromise between accuracy and memory occupancy.

Figure 12A:
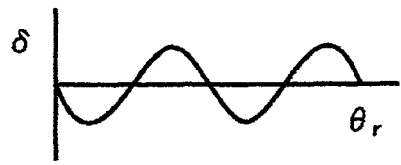
FIGS. 12A and 12B are a picture used for describing the procedure for setting up the look-up table.
Figure 12B:
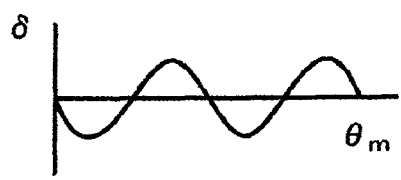

The difference $\delta$ can be obtained as a function of rotor angle $\theta_r$ by calculating respective differences $\delta$'s at individual data points $(\theta_r, \theta_m)$ by using the expression (19). FIG. 12A shows this obtained result. Then, $\delta$ is converted to a function of the magnetic field angle $\theta_m$ on the basis of the thus obtained data. FIG. 12B shows the function. In this way, Look-up Table for $\delta$ with magnetic field angle $\theta_m$ as index is obtained.

Consequently, by obtaining the Look-up Table for $\delta$ with magnetic field angle $\theta_m$ as index, it becomes possible to calculate the differences $\delta$'s corresponding to the magnetic field angles $\theta_m$'s calculated from actually measured data points. This is the gist of this embodiment.

The Look-up Table is memorized/retained in the memory of the signal processing unit in the magnetic sensor 201. Correction procedure has been thus completed.

Description will now be made of a method for processing signals when the rotational angle-measurement unit is operating, that is, when the rotational angle is measured.

To begin with, a magnetic field angle $\theta_m$ is calculated on the basis of the output signal of the magnetic sensor 201. Namely, the magnetic sensor delivers a signal $V_{cos}$ proportional to $-\cos \theta_m$ and a signal $V_{sin}$ proportional to $\sin \theta_m$, and therefore $\theta_m$ is calculated by the following expression.

[Expression 21]

$$\theta_m = \text{ArcTan}\left(\frac{V_{sin}}{-V_{cos}}\right) \quad (21)$$

Then, the difference $\delta$ corresponding to the calculated $\theta_m$ is obtained in reference to the Look-up Table of coordinates $(\delta, \theta_m)$. If a value equal to $\theta_m$ cannot be found in the Look-up Table, the required value of $\theta_m$ is obtained through interpolation from nearby values. And the difference $\delta$ corresponding to the interpolated $\theta_m$ is thus obtained. In this embodiment, the linear interpolation procedure is used in interpolating the values for $\theta_m$. The linear interpolation procedure requires fewer number of repetition of multiplications, which demand substantial time for calculation, and therefore has an advantage that high-speed calculation is feasible.

The rotational angle $\theta_r$ is obtained by the expression $\theta_r = \theta_m - \delta$.

While the conventional methods have suffered measurement inaccuracy of about $\pm 10°$ in electrical angle, the method according to this invention can reduce such measurement inaccuracy to $\pm 0.6°$ in electrical angle, making improvement in measurement accuracy.

It should be noted in this embodiment that the index in the Look-up Table is not the rotor angle $\theta_r$, but the magnetic field angle $\theta_m$. The reason for this is that the magnetic field angle $\theta_m$ is the very quantity that is measured by the magnetic sensor 201. Accordingly, the corresponding difference $\delta$ can be known directly from the actual measurement value $\theta_m$.

The Look-up Table of coordinates ($\delta$, $\theta_m$) in which $\theta_m$'s are sampled at a constant interval, enables the speed of retrieving the data out of the Table to be increased and the capacity of memory dedicated to the Table to be decreased. How this is achieved will be concretely described below. In the following description, the index $\theta_m$ in the Table is represented as independent variable "x" and the value (i.e. value of function) $\delta$ referred to in the Table is denoted by "f(x)".

Let it be assumed that $x_{min} = x[0]$ and $x_{max} = x[N_{max}]$, where $x_{min}$ and $x_{max}$ are respectively the minimum and maximum values of the independent variable x, and that the interval between those values is equidistantly divided into $N_{max}$ subintervals. Also, let the function that is the discrete version of f(x) be denoted by fn[n], and it is defined that f(x)=f(x[n])=fn [n]. Then, for an arbitrary value of the independent variable x, ix is calculated by the following expression.

[Expression 22]

$$ix = (x - x_{min}) * \frac{N_{max}}{x_{max} - x_{min}} \quad (22)$$

If the integer part and the decimal part of the obtained value ix is denoted by n and r, respectively, then it follows that:
[Expression 23]

$$f(x) = fn[n] + r*(fn[n+1] - fn[n]) \quad (23)$$

This expression is for interpolation with a linear function (i.e. linear interpolation) by using fn[n] and fn[n+1] that is obtained from the Look-up Table and that is corresponding respectively to x[n] and x[n+1] which are nearest to the value of the independent variable x.

The values of "$N_{max}/(x_{max} - x_{min})$" in the expression (22) are previously calculated when the Look-up Table is established, that is, when correction is made, and the previously calculated values are then stored as constants in the memory of the processing unit. By doing so, division process can be eliminated in the process taking place in the operation of the rotational angle-measurement apparatus. A microcontroller usually requires long time for division process, and therefore this method, which dispenses with division process, can very much expedite the operation of the rotational angle-measurement apparatus.

Moreover, according to this method, since the location corresponding to an assigned value of x, to be referred to in the Look-up Table can be specified by a single calculation with the expression (22), the operation of the rotational angle-measurement apparatus can be much accelerated.

According to this method, since only data that are stored in the Look-up Table are fn[n] (n=0~$N_{max}$), $x_{min}$, $x_{max}$, and $N_{max}/(x_{max}-x_{min})$ and since data x[n] ((n=0~$N_{max}$) are not required to be stored, the memory for storing data can be economized.

The method for obtaining the rotational angle $\theta_r$ of the rotation shaft 121 will now be described below.

Figure 13:
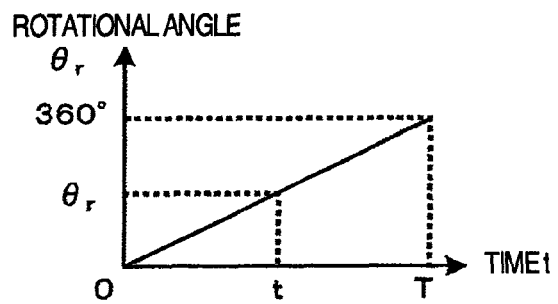
FIG. 13 graphically shows the relationship of time vs rotational angle during rotation at a constant speed.

FIG. 13 is a rectangular coordinate representation of the relationship between the measurement time t and the rotational angle $\theta_r$ of the rotation shaft 121, observed while the rotation shaft 121 is rotating at a constant rotational speed $\omega$. Since the rotation shaft 121 is rotating at a constant rotational speed $\omega$, $\theta_r$ is proportional to t.

As apparent from FIG. 13, the rotational angle $\theta_r(t)$ at any time t of measurement can be given by the following expression.

[Expression 24]

$$\theta_r(t) = \frac{t}{T} * 360° \quad (24)$$

where T is time required for the rotation shaft 121 to make one revolution (i.e.
one period). The period T can be obtained by determining the two consecutive time points (earlier one being the starting point of rotation, i.e. t=0) at which time points the magnetic sensor 201 detects the same value for the magnetic field angle $\theta_m$.

When the rotation shaft 121 is rotating at a constant rotational speed $\omega$, the rotational angle $\theta_r$ can be known by referring to the expression (24). It is to be noted here that no additional correction unit such as an encoder is needed to determine the rotational angle $\theta_r$.

In both FIG. 13 and the expression (24), the rotational angle $\theta_r$ is set to zero at time t=0. It is however evident that even if the rotational angle at t=0 is of any value other than zero, the value of the rotational angle $\theta_r$ is likewise obtainable though the origin for the rotational angle $\theta_r$ is shifted to a certain extent. The origin for $\theta_r$ can be made coincident with that for $\theta_m$ according to the above described method.

Now, consideration will be made of a case where rotational speed changes with time at a known rate. On the assumption that the rate of change A(t) in the rotational speed $\omega$ is variable with time, let it be assumed that $\omega(t) = \omega_0 * A(t)$. In this case, rotational angle $\theta_r(t)$ at time t can be calculated by the following expression.

[Expression 25]

$$\theta_r(t) = \frac{\int_0^t \omega_0 A(\tau) d\tau}{\int_0^T \omega_0 A(\tau) d\tau} * 360° = \frac{\int_0^t A(\tau) d\tau}{\int_0^T A(\tau) d\tau} * 360° \quad (25)$$

For example, in case where rotational speed changes at a constant acceleration or at a known rate (with ripples contained), the rotational angle $\theta_r$ at time t can be obtained by using the expression (25).

According to this embodiment, the difference $\delta$ is obtained from the Look-up Table by using the magnetic field angle $\theta_m$ actually measured by the magnetic sensor 201, and then the rotor angle $\theta_r$ is obtained. It is therefore necessary that a magnetic field angle $\theta_m$ should uniquely determine the corresponding difference $\delta$.

In case where the sensor magnet 202 is a 2-pole magnet, this requirement is satisfied. The 2-pole magnet is a magnet having an N-pole and an S-pole. Since, with the 2-pole magnet, one revolution of the rotation shaft 121 causes one period of change in the magnetic field angle $\theta_m$, the above requirement is met.

According to this invention, therefore, if a 2-pole magnet is used as the sensor magnet, a great advantage can be enjoyed since factors for any type of inaccuracy such as mount inaccuracy of magnet and sensor or magnetization inaccuracy of magnet can be corrected.

Now, description is made of a case where a multi-pole magnet is used as the sensor magnet. Let it be assumed that the multi-pole magnet is a (2N)-pole magnet having N sets of N-pole and S-pole. In this case, one revolution of the (2N)-pole magnet results in the change of the magnetic field angle over N periods. Here, let each period be referred to as a sector. Accordingly, the (2N)-pole magnet can be said to cover N sectors.

In the range of one sector, the difference $\delta$ corresponding to a magnetic field angle $\theta_m$ is uniquely determined. Accordingly, when a (2N)-pole magnet is used and if magnetization inaccuracies in different sectors fall within a negligibly small range, the correction method according to this invention is effective.

Further, also in case where the operable range of the rotation shaft 121 is smaller than one sector, $\delta$ is uniquely determined from $\theta_m$. Therefore, in this case, too, the correction method according to this invention is effective.

In case where use is made of a multi-pole magnet whose magnetization inaccuracies in different sectors are not negligible, a rotational position sensor such as an optical encoder is attached to the rotation shaft 121 to obtain sector information for locating the current sector. And the difference $\delta$ corresponding to a magnetic field angle $\theta_m$ can be obtained on the basis of the sector information. Angle resolution required for the rotational position sensor used here, is such that it is good enough if the sensor has only to locate the current sector.

Also, since the current sector can be calculated from the amount of shift of the rotational angle, the information on the current sector may be stored in the detection circuit unit 302. The difference $\delta$ can be calculated from the information on the current sector and the actually measured magnetic field angle $\theta_m$. Such an artifice may preferably be devised as to discriminate a specific sector magnetically by changing magnetic field distribution by, for example, providing a mechanical notch in one of the plural poles of the magnet sensor 201.

Disclosed in, for example, JP-3799270 is a method for measuring the mutual relationship between the rotational angle of the rotation shaft and the output value of the magnetic sensor and making correction by using the relationship, the method being adopted in an rotational angle detecting apparatus using magneto-resistance elements.

However, according to this conventional example, correction is made by expressing the relationship between the rotational angle of the rotation shaft and the output voltage of the magneto-resistance element, by an approximate expression. In this case, the approximate expression must be complex if the relationship between the rotational angle of the rotation shaft and the output voltage of the magneto-resistance element becomes complex, that is, if the relationship between $\delta$ and $\theta_m$ (hereafter referred to as "$\delta$-$\theta_m$" distribution") as shown in FIGS. 12A and 12B take a complex shape. Accordingly, there arises a problem that operational time required for correction calculation increases. In this embodiment, on the other hand, correction calculation can be implemented through linear interpolation using two nearest data points even if the $\delta\theta_m$ distribution takes a complex shape. Hence, the operational time for correction can be shortened.

In case of expressing the relationship by an approximate expression, if the $\delta$-$\theta_m$ distribution takes a complex shape, the approximate expression tends to incur a relatively large inaccuracy. This embodiment can cope with the $\delta$-$\theta_m$ distribution no matter what shape it may take.

In this invention, a simple method for correcting magnetic field distribution may be additionally used. Namely, a corrected angle $\theta_{adj}$ treated by some correction process is substituted for the magnetic field angle $\theta_m$ in the step of compiling the Look-up Table; the difference $\delta$ is calculated by using the expression:

[Expression 26]

$$\delta = \theta_{adj} - \theta_r \tag{26};$$

and a revised Look-up Table is compiled by listing the relationship between $\delta$ and $\theta_{adj}$ (with $\theta_{adj}$ as index). When measurement is made, the corrected angle $\theta_{adj}$ is calculated from the magnetic field angle $\theta$ measured by the magnetic sensor 201, and thereafter a correct rotor angle $\theta_r$ is obtained by using the expression $\theta_r = \theta_{adj} - \delta$.

Since the difference $\delta$ is made small by using the corrected angle $\theta_{adj}$ in place of the magnetic field angle $\theta_m$, accuracy in correction is improved. Further, the dependence upon angle of the difference $\delta$ becomes small through the use of the corrected angle so that accuracy in the calculation of the values for difference $\delta$ through interpolation becomes improved, whereby accurate correction can be made with less data points. Accordingly, the number of data points used in the Look-up Table is lessened and therefore correction becomes possible with less memory capacity.

According to the method disclosed in JP-3799270, it is necessary to set the rotational angle of the rotation shaft at a predetermined value in the measurement of the relationship between the rotational angle of the rotation shaft and the output voltage of the magneto-resistance element. Accordingly, a rotary encoder must be additionally employed to perform measurement for correction. According to this invention, on the contrary, there is no need for an additional encoder in order to effect such correction as described above.

Details will now be described of how to incorporate into a system a rotational angle-measurement apparatus fabricated as described above. In this embodiment is exemplified a case where a rotational angle-measurement apparatus is incorporated in an electrically power-assisted steering apparatus.

Figure 14:
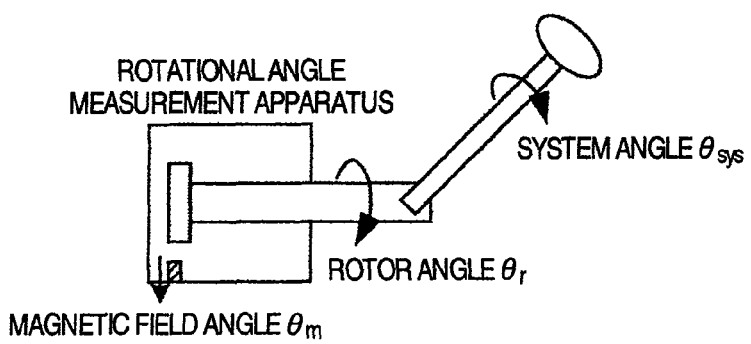
FIG. 14 is a picture used for illustrating the angular coordinates used in a system in which a rotational angle-measurement apparatus according to this invention is installed.
Figure 15:
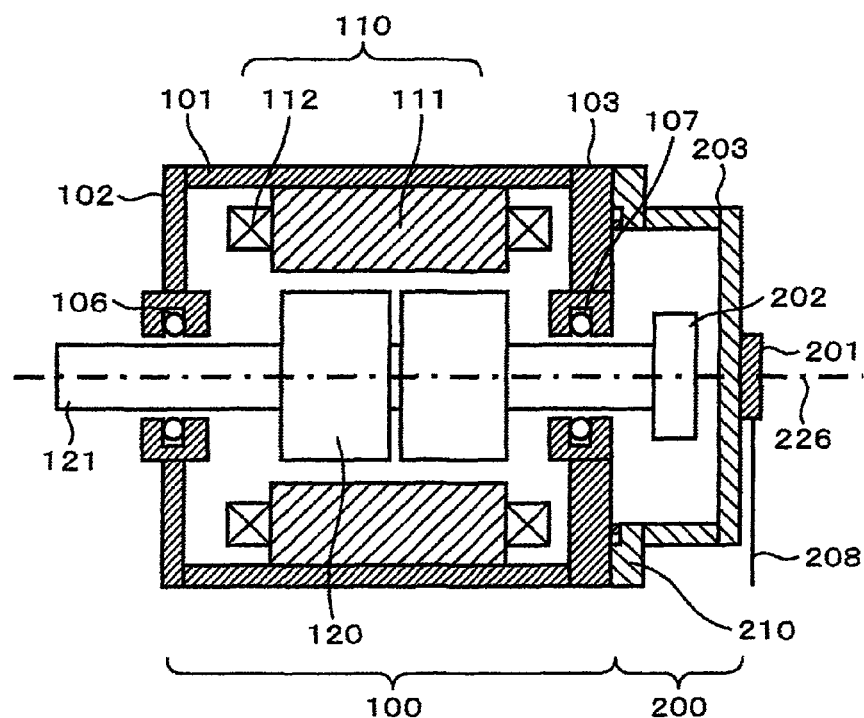
FIG. 15 is a cross-sectional view of a rotational angle-measurement apparatus as the fifth embodiment of this invention.

FIG. 14 schematically shows an electorally power-assisted steering system.

After initially setting the system at the angle origin and system origin, the rotational angle $\theta_{r0}$ of the rotation shaft 121 is read out. To be concrete, the rotational angle $\theta_r$ of the rotation shaft 121 is obtained by obtaining the magnetic field angle $\theta_m$ through measurement with the magnetic sensor 201 and then referring to the Look-up Table for difference $\delta$. Then, the rotational angle $\theta_{r0}$ corresponding to the system origin is stored in the control unit (electronic control unit ECU) of the electorally power-assisted steering system.

Even if there is mount inaccuracy in mounting the rotational angle-measurement apparatus onto the system, the mount inaccuracy can be corrected if the value for the rotational angle $\theta_{r0}$ corresponding to the system origin is known.

Information usually required by a system such as a power-assisted steering system is a system angle $\theta_{sys}$. According to this embodiment, such a system angle $\theta_{sys}$ can be exactly obtained on the basis of the magnetic field angle $\theta_m$ obtained from the output signal of the magnetic sensor 201.

The second embodiment of this invention will be described in reference to FIGS. 26 and 27. This embodiment is concerned with a method for improving the temperature characteristic of the magnetic sensor 201 to a great extent.

Rotational angle sensors have been suffering from a problem that temperature change causes deterioration in measurement accuracy. That is the problem of poor temperature characteristic. According to this embodiment, the temperature characteristic of the magnetic sensor 201 is improved by improving the magnetic field angle-measurement method employed in the magnetic sensor 201.

The cause for the deterioration of the temperature characteristic in the magneto-resistance element is due to the superposition of offset voltages upon the output signals of the sensor element unit 301 incorporated in the magnetic sensor 201. This point is described in detail below. Since the GMR coefficient G/R in the expression (6) changes with temperature, the value of $\Delta V_c$ changes with the change in temperature. As apparent from the expressions (6), (7) and (8), however, since the magnetic field angle $\theta_m$ is calculated from the ratio of $\Delta V_s$ to $\Delta V_c$, the change in the coefficient G/R depending on temperature is offset. Accordingly, the value for $\theta$ calculated from the actually measured value is not to be changed depending on temperature from an ideal point of view.

However, in the actual bridge using GMR elements, offset voltages are superposed on $\Delta V_c$ and $\Delta V_s$, as denoted in the following expressions (27).

[Expression 27]

$$\Delta V_c = V_2 - V_1 = -e_0 \frac{G}{2R} \cos\theta + \Delta V_c(ofs) \quad (27)$$

$$\Delta V_s = V_2 - V_1 = e_0 \frac{G}{2R} \sin\theta + \Delta V_s(ofs)$$

As a result, the ratio $\Delta V_s/\Delta V_c$ is not equal to $\tan\theta$, and even if the ratio $\Delta V_s/\Delta V_c$ is obtained, the GMR coefficients G/R's of the numerator and denominator do not cancel each other so that the magnetic field angle $\theta_m$ changes with temperature.

Accordingly, even if offset adjustment is made at room temperatures in a detection circuit 351A, that is, even if the offset voltage $\Delta V_c$ (ofs) is eliminated to obtain a correct magnetic field angle $\theta_m$, change in temperature still causes change in offset value so that a correct value for the magnetic field angle $\theta_m$ cannot be obtained. This is the cause for the deterioration of the temperature characteristic mentioned above.

The cause that an offset voltage is generated in the signal voltage $\Delta V_c$ (ofs), is due to the fact that the electric resistances of the four elements constituting the bridge are not equated to the same value at $\theta=90°$ (i.e. $\cos\theta=0$) since the characteristics of the elements vary from one another.

Figure 26:
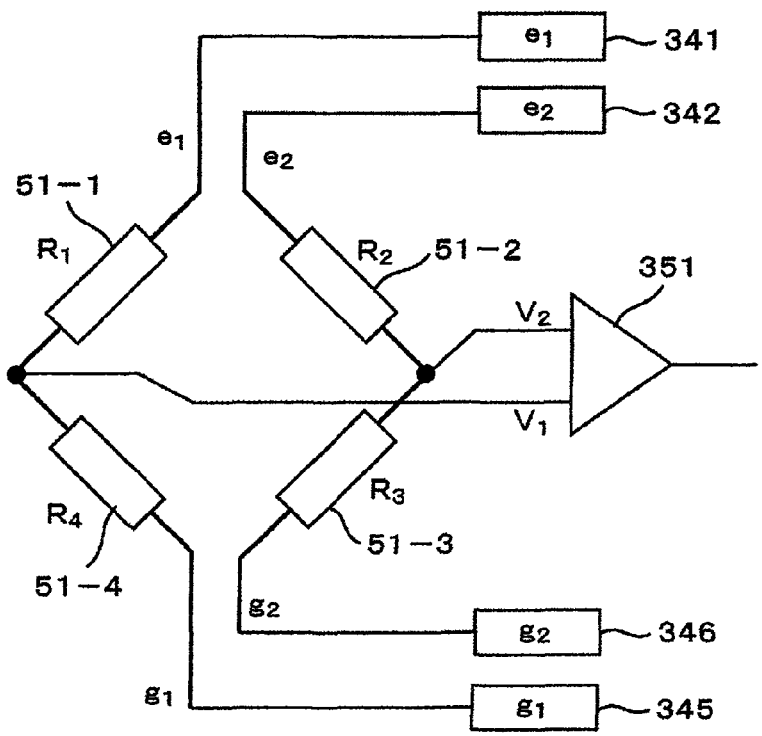
FIG. 26 schematically shows the structure of the sensor element unit used in the second embodiment of this invention.

FIG. 26 schematically shows the structure of a bridge incorporated in the magnetic sensor 201 used in this embodiment.

In this embodiment, the COS bridge in the sensor element unit 301 constituting the magnetic sensor 201 comprises four GMR elements 51-1, 51-2, 51-3 and 51-4. FIG. 26 shows the electric connections among these elements. The SIN bridge (not shown in FIG. 26) also has a similar structure. This embodiment will be described below with respect to the COS bridge.

The half-bridge consisting of the GMR elements 51-1 and 51-4 is connected with a positive-polarity output unit $e_1$ (341) and a negative-polarity output unit $g_1$ (345). The connection point between the GMR elements 51-1 and 51-4 is used as a signal terminal $V_1$.

The half-bridge consisting of the GMR elements 51-2 and 51-3 is connected with a positive-polarity output unit $e_2$ (342) and a negative-polarity output unit $g_2$ (346). The connection point between the GMR elements 51-2 and 51-3 is used as a signal terminal $V_2$.

The signal terminals $V_1$ and $V_2$ are connected with a detection circuit 351, which detects a difference voltage $\Delta = V_2 - V_1$, that is, the difference between the voltages at the terminals $V_1$ and $V_2$.

The feature of this embodiment is that the bridge consisting of four GMR elements is divided into two half-bridges and the two half-bridges are powered by different voltages $e_1$ and $e_2$, respectively. With this circuit configuration, it becomes possible to eliminate offset voltages as described below.

As shown in FIG. 26, the GMR elements 51-1, 51-2, 51-3 and 51-4 are designated to have resistance values $R_1$, $R_2$, $R_3$ and $R_4$, respectively.

Let it be assumed that the magnetization directions of the pinned magnetic layers 13 in the GMR elements $R_1$ (51-1) and $R_3$ (51-3) are given by $\theta_p=0$ and that the magnetization directions of the pinned magnetic layers 13 in the GMR elements $R_2$ (51-2) and $R_4$ (51-4) are given by $\theta_p=180°$. Since the magnetization direction $\theta_f$ of the free magnetic layer is determined depending on the external magnetic field, the four GMR elements have the same magnetization direction in their free magnetic layers. It therefore holds that $\Delta\theta_{f2}=\theta_f-\theta_{p2}=\theta_f-\theta_{p1}-\pi=\Delta\theta_1+\pi$. It also holds that $\Delta\theta_1=\theta$ since $\Delta\theta_1$ is measured in reference to $\theta_p=0$. Accordingly, as apparent from the expression (1), the expression (2) holds for $R_1$ and $R_3$ (n=1, 3) while the expression (3) holds for $R_2$ and $R_4$ (n=2, 4).

The difference voltage $\Delta V$ ($=V_2-V_1$) between the terminals 1 and 2 of the bridge circuit in FIG. 26 is given by the following expression.

[Expression 28]

$$\Delta v = \frac{e_2 R_1 R_3 - e_1 R_2 R_4 + R_3 R_4(e_2 - e_1)}{(R_1 + R_4)(R_2 + R_3)} \quad (28)$$

$$= \frac{e_2 R_1 R_3 - e_1 R_2 R_4}{(R_1 + R_4)(R_2 + R_3)} + \frac{R_3 R_4(e_2 - e_1)}{(R_1 + R_4)(R_2 + R_3)}$$

The above consideration is extended to such a general case where other elements than GMR elements are used as described below. A case is considered where $R_1$ and $R_3$, which make one opposite resistor pair in the bridge, change as follows (n=1, 3):

[Expression 29]

$$R_n = R_{n0} + \Delta R \quad (29)$$

Another case is also considered where $R_2$ and $R_4$, which make the other opposite resistor pair in the bridge, change as follows (n=2, 4).

[Expression 30]

$$R_n = R_{n0} - \Delta R \quad (30)$$

If a concrete case is considered where GMR elements are used, the value obtained when the magnetic field angle A is equal to 90° corresponds to $R_{n0}$. This is evident through comparison of the expressions (2) and (3) with the expressions (29) and (30).

When $\Delta R=0$, the difference voltage $\Delta V$ ($=V_2-V_1$) between the terminals 1 and 2 of the bridge in FIG. 26 is calculated as given below from the expression (28).

[Expression 31]

$$\Delta v = \frac{e_2 R_{10} R_{30} - e_1 R_{20} R_{40} + R_{30} R_{40}(e_2 - e_1)}{(R_{10} + R_{40})(R_{20} + R_{30})} \quad (31)$$
$$= \frac{e_2 R_{10} R_{30} - e_1 R_{20} R_{40}}{(R_{10} + R_{40})(R_{20} + R_{30})} + \frac{R_{30} R_{40}(e_2 - e_1)}{(R_{10} + R_{40})(R_{20} + R_{30})} \equiv \Delta v_0$$

Since this value is calculated for $\Delta R=0$, it is defined as "$\Delta V_0$". Then, a similar value for $\Delta R \neq 0$ is obtained as follows.

[Expression 32]

$$\Delta v = \frac{e_2 R_{10} R_{30} - e_1 R_{20} R_{40} + R_{30} R_{40}(e_2 - e_1)}{(R_1 + R_4)(R_2 + R_3)} + C\Delta R \quad (32)$$

[Expression 33]

$$C = \frac{e_2(R_{10} + R_{30}) + e_1(R_{20} + R_{40}) + (R_{40} - R_{30})(e_2 - e_1)}{(R_1 + R_4)(R_2 + R_3)} \quad (33)$$

The numerator of the first term in the expression (32) is the same as the corresponding numerator in the expression (31). Accordingly, if it is assumed that $\Delta V_0=0$, the expression (32) yields the following proportionality relationship.

[Expression 34]

$$\Delta v = C\Delta R \quad (34)$$

Here, the proportionality factor C is what is given by the expression (33).

If $\Delta V_0$ defined by the expression (31) is rendered equal to zero by adjusting the voltage difference ($e_2-e_1$), then the signal voltage $\Delta V$ of the bridge shown in FIG. 26 is rid of offset voltage. As a result, a desirable characteristic that $\Delta V$ is proportional to the variable quantity $\Delta R$ can be realized.

The gist of this embodiment is to be able to separately adjust the excitation voltages $e_1$ and $e_2$ that are applied to the two pairs of half-bridges. In order to make this point clear, the difference of this embodiment from the conventional examples will be clarified below.

Figure 4:
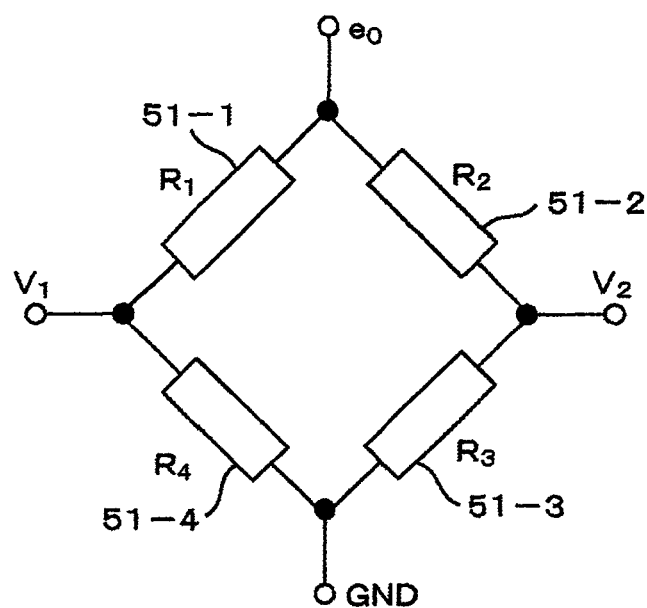
FIG. 4 schematically shows a bridge structure incorporated in the magnetic sensor used in the rotational angle-measurement apparatus as the first embodiment of this invention.

In case of a conventional bridge configuration shown in FIG. 4, since the four GMR elements have unequal characteristics, the equation $R_1 R_3 = R_2 R_4$ is not satisfied even if $\theta=90°$, so that the numerator in the expression (4) does not vanish. Namely, offset voltage remains contained in the signal voltage $\Delta V$. From the viewpoint of the expression (31), when $e_1=e_2$, the first and second terms in the expression (31) vanish together in case of an ideal bridge for which the equation $R_1 R_3 = R_2 R_4$ is satisfied. However, in case where the equation $R_1 R_3 = R_2 R_4$ is not satisfied due to the unequal characteristics of the GMR elements, the first term in the expression (31) does not vanish so that offset voltage is generated. According to this embodiment, on the contrary, as apparent from the expression (31), $\Delta V_0$ can be set to zero at $\theta=90°$ by adjusting the voltage difference ($e_2-e_1$). As a result, offset voltage can be eliminated as described above.

Now, temperature characteristics will be considered with respect to the bridge of sensor elements shown in FIG. 26.

The temperature characteristic of the resistivity of a substance can be represented by the following expression.

[Expression 35]

$$R(T)=R(T_0)[1+a(T-T_0)]=R(T_0)(1+a\Delta T) \quad (35)$$

The substitution of the expression (35) into the numerator of the first term of the expression (32) and the rearrangement of the expression (32) yield (1+a$\Delta T$) as a multiplication factor. Therefore, if $\Delta V_0$ is equated to zero at a certain temperature, it follows that $\Delta V_0=0$ at any other temperature.

Namely, according to this embodiment, if the voltage difference ($e_2-e_1$) is so adjusted that $\Delta V_0=0$ at a certain temperature, e.g. at one of room temperatures, $\Delta V_0=0$ at any other temperature. This means that the proportionality relationship given by the expression (34) is obtained. Thus, a signal free of offset voltage can be obtained over a wide range of temperatures.

In this way, according to this embodiment, since the temperature characteristic of a magnetic field detection apparatus can be adjusted after manufacturing at a certain temperature alone, e.g. at one of room temperatures, the number of steps of examination/adjustment procedure can be decreased to a great extent.

Next, a magnetic field detection apparatus using GMR elements will be considered. $R_1$ and $R_2$ are represented as follows according to the expression (2):

[Expression 36]

$$R_n = R_{n0} - \frac{G}{2}\cos\theta \quad (36)$$

In comparison with the expression (29), the difference voltage signal in case of using GMR elements is denoted by the following expression.

[Expression 37]

$$\Delta v = -\frac{CG}{2}\cos\theta \quad (37)$$

Namely, a signal proportional to the cosine of the magnetic field orientation $\theta$ can be obtained. The thus obtained signal is denoted by $\Delta V_c$.

The constant C is the value that is obtained from the expression (33).

In the rotational angle-measurement apparatus according to this embodiment, the structure of the motor unit 100 is the same as that in the embodiment 1. Although the structure of the rotational angle-measurement unit 200 is the same as that in the embodiment 1, the structure of the magnetic sensor 201 is replaced by the structure described above. The correction method that makes the rotor angle $\theta_r$ correspond to the magnetic field angle $\theta_m$ measured by the magnetic sensor 201, is the same as that which is employed in the embodiment 1.

According to this embodiment, temperature characteristic can be improved; the accurate measurement of rotor angle can be effected due to correction of magnetic field; and therefore a rotational angle-measurement apparatus operable with high precision over a wide range of temperatures can be realized.

According to this embodiment, since the measurement of rotor angle can be performed over a wide range of temperatures by simply adjusting the bias voltage ($\Delta e=e_1-e_2$) for the detection circuit unit 302 of the magnetic sensor 201 at room temperatures, a low-cost rotational angle-measurement apparatus can be provided which requires a small number of steps for correction and adjustment.

Next, the third embodiment of this invention will be described in which offset voltage attributable to the circuit configuration of the detection circuit unit 302 can be reduced. In the rotational angle-measurement apparatus of this embodiment, the structure of a motor unit 100 is the same as that described in the embodiment 1, and the structure of a rotational angle-measurement unit 200 is the same as that described in the embodiment 2.

This embodiment will be described in detail with reference to FIG. 27.

According to this embodiment, magnetic field is accurately detected by eliminating an offset voltage attributable to a detection circuit.

Figure 27:
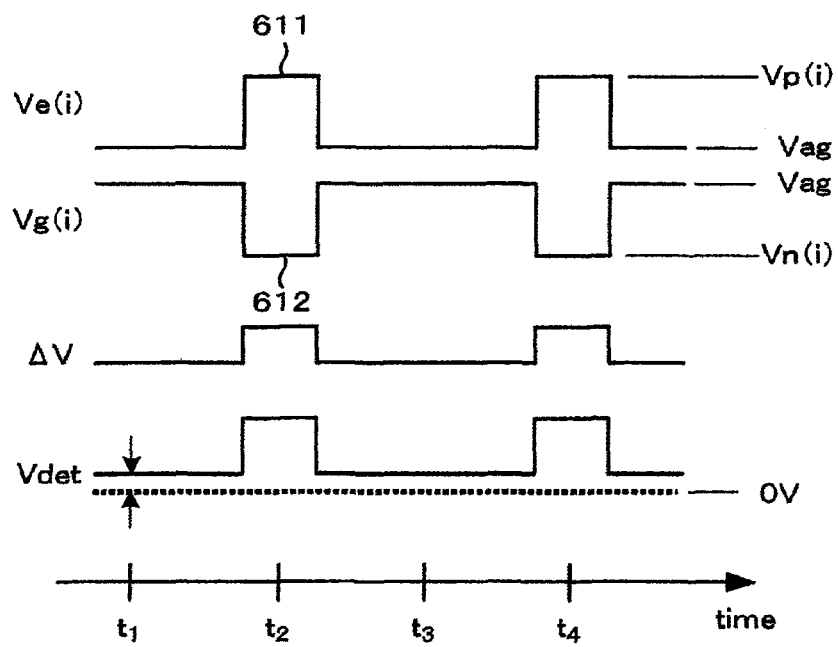
FIG. 27 is a diagram used for describing the excitation voltage waveforms and detection timing in the third embodiment of this invention.

FIG. 27 shows waveforms of the excitation voltages applied to the half-bridges consisting of GMR elements as shown in FIG. 26. Here, the excitation voltage waveforms applied to the $e_1$ and $e_2$ terminals in FIG. 26 are denoted by $V_e(1)$ and $V_e(2)$, respectively, and the excitation voltage waveforms applied to the $g_1$ and $g_2$ terminals in FIG. 26 are denoted by $V_g(1)$ and $V_g(2)$, respectively. Also, the corresponding difference voltage signal $\Delta V = V_2 - V_1$ is shown in FIG. 27.

At time $t_1$, a reference voltage $V_{ag}$ is applied to both terminals $V_e(i)$ and $V_g(i)$ (i=1, 2). Accordingly, the positive-polarity terminal $e_1$ and the negative-polarity terminal $g_1$ of the bridge are both maintained at the same voltage $V_{ag}$, and therefore both the terminals $V_1$ and $V_2$ develop the signal voltage $V_{ag}$ so that the difference voltage signal $\Delta V = V_2 - V_1$ is reduced to zero.

Consequently, the instantaneous value $V_{det}(t_1)$ at time $t_1$ of the output voltage $V_{det}(t)$ of the detection circuit 351 is the offset voltage attributable to the detection circuit 351. At time $t_2$, the positive-polarity output unit 341 delivers a positive-polarity pulse 611, and the negative-polarity output unit 345 delivers a negative-polarity pulse 612. As a result, the difference voltage signal $\Delta V = V_2 - V_1$ becomes a signal voltage corresponding to the magnetic field angle.

The difference signal $\Delta V_{det} = V_{det}(t_2) - V_{det}(t_1)$ calculated between times $t_1$ and $t_2$ becomes a signal voltage free of the offset voltage attributable to the detection circuit 351. In this way, the offset voltage attributable to the detecting circuit is eliminated so that magnetic field can be accurately measured.

In like manner, the difference signal $\Delta V_{det} = V_{det}(t_4) - V_{det}(t_3)$ is a signal voltage at time $t_4$.

In this way, according to this embodiment, the essential point is to maintain the four terminals $e_1$, $e_2$, $g_1$ and $g_2$ of the bridge of FIG. 26 at the same potential ($V_{ag}$ in FIG. 27) and to subtract a reference voltage from this potential, the reference voltage being the output voltage $V_{sig}(t_1)$ of the detection circuit at this time point. This procedure makes it possible to perfectly separate the offset voltage attributable to the GMR elements from the offset voltage attributable to the detection circuit.

Further, according to this embodiment, the reference signal $V_{det}(t_1)$ is first measured, the signal voltage $V_{det}(t_2)$ for exciting the GMR elements is then obtained, and finally the signal voltage $\Delta V_{det} = V_{det}(t_2) - V_{det}(t_1)$ is obtained. This order of process makes minimum the time lag between the output signal at the time of signal measurement (i.e. sampling) and the output signal after signal processing. This constitution is specifically important in an application to a magnetic field detection circuit that may be used for the measurement of, for example, the rotational angle of a motor shaft, which requires high speed responses.

In this embodiment, the GMR elements are excited for current conduction only during the period of time when the positive-polarity pulse 611 and the negative-polarity pulse 612 are being supplied. Accordingly, a magnetic field detection apparatus with low electric power consumption can be realized. To be concrete, if the duty ratio during voltage application is set to 10%, consumed electric power is reduced to one tenth.

According to this embodiment, since electric power consumed in the GMR elements can be decreased, heat generation (Joule heat) through the GMR elements can be decreased, and therefore the advantage can be enjoyed that the change in the characteristics of the GMR elements due to temperature rise can be suppressed.

Further, according to this embodiment, the voltage amplitudes of the positive-polarity pulse 611 and negative-polarity pulse 612 are set nearly equal to each other. By doing so, the values of the signal voltages $V_1$ and $V_2$ do not largely change at the time of zero point detection (at $t_1$) and at the time of signal detection ($t_2$). Therefore, the advantage is enjoyed that the requirement for the common-mode rejection ratio CMRR for the differential detector 351 can be less strict.

Now, the fourth embodiment of this invention will be described with reference to FIGS. 28 and 29. This embodiment has the same constitution as the second embodiment described above, but has the structure of the magnetic sensor 201 modified as described below.

Figure 28:
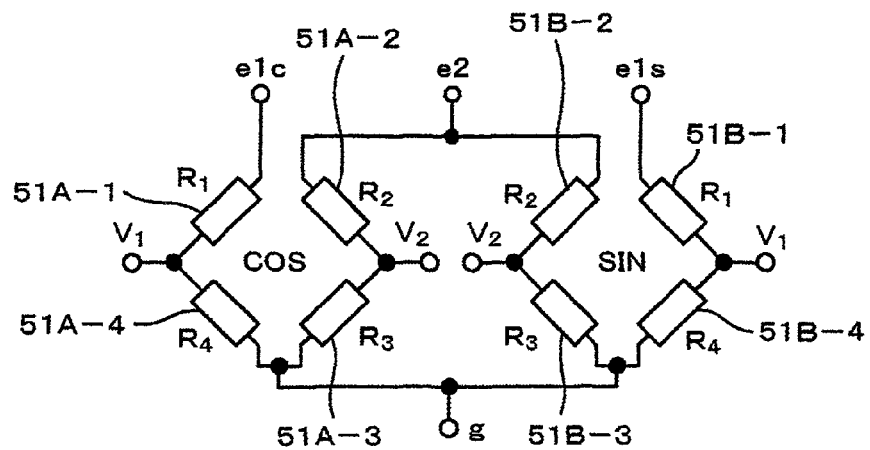
FIG. 28 schematically shows the structure of the sensor element unit used in the fourth embodiment of this invention.

FIG. 28 shows the structure of the sensor element unit 301 in the magnetic sensor 201 used in this embodiment. FIG. 29 diagrammatically shows the waveforms of excitation voltages and detecting timing, used in this embodiment.

As shown in FIG. 28, according to this embodiment, the number of wiring conductors connecting between the sensor element unit 301 and the detection circuit unit 302 is diminished by reducing the number of terminals coming out of the sensor element unit 301. As shown in FIG. 28, the g terminals of half-bridges each consisting of GMR elements, are connected together whereas the $e_2$ terminal of COS bridge and the $e_2$ terminal of SIN bridge are connected together.

As described above, the uneven characteristics of the GMR elements generate a signal offset voltage causative of the deterioration of temperature characteristics of the magnetic sensor 201. Accordingly, that optimal value of the bias voltage $\Delta e = e_2 - e_2$ for the COS bridge which renders the offset voltage to zero, is not equal to the corresponding optimal value for the SIN bridge.

Therefore, according to this embodiment, the application of the excitation voltage to the COS bridge is shifted in time from the application of the excitation voltage to the SIN bridge so that wiring conductors can be shared between the bridges and that the number of terminals coming out of the sensor element unit 301 can be lessened.

Figure 29:
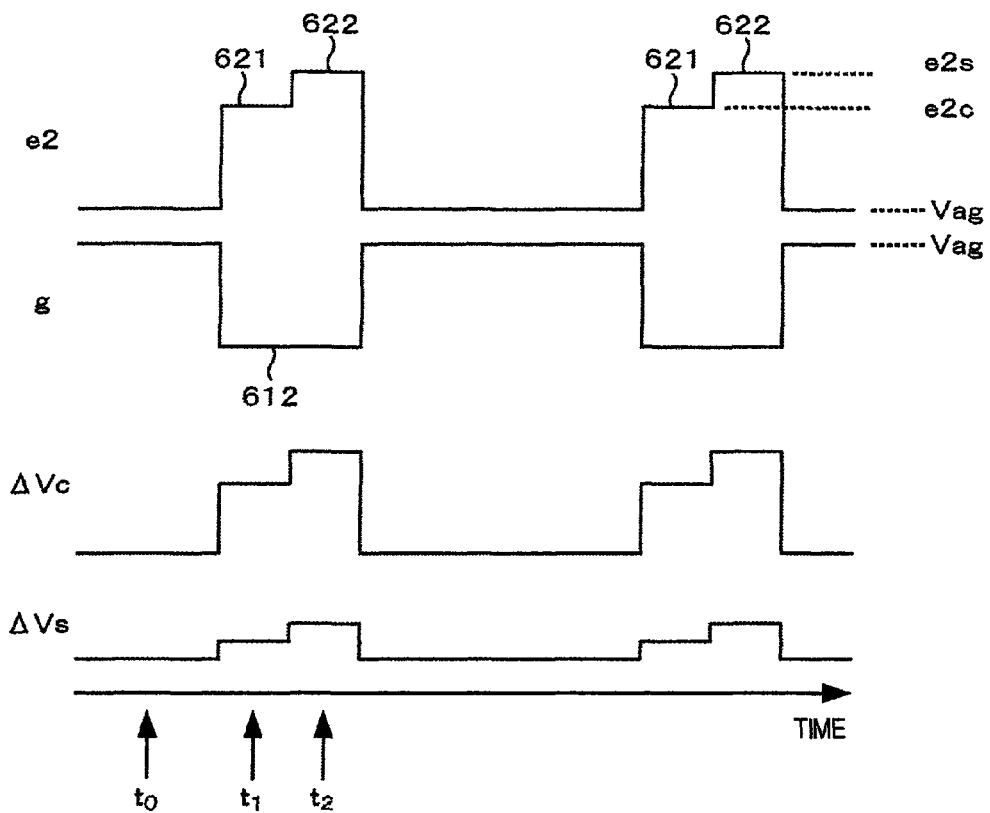
FIG. 29 is a diagram used for describing the excitation voltage waveforms and detection timing in the fourth embodiment of this invention.

FIG. 29 diagrammatically shows the waveforms of excitation voltages and detecting timing, used in this embodiment, and corresponds to FIG. 27 which is associated with the third embodiment of this invention. The positive-polarity pulse 621 for the COS bridge and the positive-polarity pulse 622 for the SIN bridge are applied sequentially with a certain time shift. The negative-polarity pulse 612 is applied to the g terminal.

As a result of this shifted application of pulses, the signal voltage $\Delta V_c$ for the COS bridge and the signal voltage $\Delta V_s$ for the SIN bridge change as shown in FIG. 29. The zero point signal $V_z$ is measured at time $t_0$. Then, the signals for the COS bridge and SIN bridge are obtained at times $t_1$ and $t_2$, respectively.

In this way, since the signal is measured under the condition that the optimal excitation voltages $\Delta e$ are applied to the COS and SIN bridges, respectively, then the offset component, that may be otherwise contained in the signal voltage, can be eliminated. Accordingly, as described with the second embodiment, a magnetic sensor 201 having a desirable temperature characteristic can be obtained.

Although the structure of the sensor element unit 301 is as shown in FIG. 28 according to this embodiment, it is not mandatory, but a mere example. It is needless to say that persons skilled in the art may apply the spirit of this embodiment to a case where the e terminals and/or the g terminals are shared between bridges, or any other feasible case.

Now, the fifth embodiment of this invention will be described with reference to FIG. 1.

In this embodiment, a magnetic sensor is mounted on the outer surface of the chassis of a rotational angle-measurement apparatus. With this structure, the magnetic sensor can be easily mounted. Moreover, since it is not necessary to lead out the wiring conductors for the magnetic sensor from inside the chassis of the rotational angle-measurement apparatus, assembling and manufacturing a rotational angle-measurement apparatus can be facilitated especially for water-proof structure.

The rotational angle-measurement apparatus of this embodiment consists mainly of a motor unit 100 and a rotational angle-measurement unit 200. The structure of the motor unit 100 is the same as the motor unit of the first embodiment.

The rotational angle-measurement unit 200 comprises a sensor magnet 202 mounted on a rotation shaft 121, a housing 203 attached to the chassis of a motor unit 100, and a magnetic sensor 201.

In this embodiment, the rotational angle-measurement unit is of water-proof structure. Accordingly, a sealant 210 is inserted between the housing 203 and the second bracket 103. By doing so, the housing 203, the second bracket 103, the frame 101 and the first bracket 102 can together provide a water-proof structure. In this patent specification, such a boundary as prevents water penetration from outside is called "water-proof boundary".

By inserting sealants between members that form a water-proof boundary, such a structure is provided as can prevent water penetration into the space defined by the members. Therefore, in case where wiring conductors have to be passed through the water-proof boundary, a connector molded with resin must serve as the water-proof boundary so that electric connection can be provided between the inside and outside of the boundary by connecting wiring conductors with the connector.

The magnetic sensor 201 is mounted on the outer surface of the housing 203. In this embodiment, since the magnetic sensor 201 is disposed outside the water-proof boundary, the lead wires 208 for signal transfer from the magnetic sensor 201 are also outside the water-proof boundary so that they need not pass through the water-proof boundary. Accordingly, the advantage is enjoyed that the signal lead wires 208 can be of simple structure.

Since the housing 203 is located between the sensor magnet 202 and the magnetic sensor 201, material and shape of the housing 203 must satisfy a certain condition.

Material having magnetic susceptibility of 0.01 or less should be used for the housing 203. As a result, the corresponding permeability $\mu_r=1+\chi$ falls in the range of 0.09~1.01. These values within the range are nearly equal to the permeability of air, i.e. 1. Therefore, the static magnetic field is not affected by the housing 203. Such desirable materials include, but are not limited to, aluminum ($\chi=2\times10^{-5}$), copper ($\chi=-9\times10^{-6}$), copper alloys (brass and cupronickel) and resins.

It is sometimes preferable to use metal as material for the housing. This is due to the fact that mental is mechanically stronger and easier to work than resin. If metal is used for the housing, a restriction in addition to the requirement for magnetic susceptibility must be taken into consideration. Namely, magnetic field variable with time must be detected.

Since the rotation of the rotation shaft 121 at f[Hz] causes the sensor magnet 202 to rotate at the same frequency so that magnetic field passing through the housing 203 changes with time. In order for the magnetic sensor 201 to be able to measure the magnetic field effectively, the thickness t (in meter) of that part of the housing 203 which is between the sensor magnet 202 and the magnetic sensor 201, is made to satisfy the following inequality.

[Expression 38]

$$\exp\left(-\frac{t}{\delta_{skin}}\right) \geq 0.6 \tag{38}$$

$$\delta_{skin} = \sqrt{\frac{\rho}{\pi N_p f \mu_r \mu_0}}$$

$$= 503\sqrt{\frac{\rho}{N_p f \mu_r}}$$

$$= 503\sqrt{\frac{\rho}{N_p f (1+\chi)}}$$

where $\delta_{skin}$ is the skin depth (in meter) of the material making the housing 203, $\rho$ the resistivity (in $\Omega$m) of the housing, $\mu_0$ the permeability of vacuum ($=4\pi\times10^{-7}$), and $\mu_r$ the relative permeability of the housing material related to magnetic susceptibility such that $\mu_r=1+\chi$. Further, f denotes the maximum rotational frequency of the rotation shaft 121, and $N_p$ is half the number of the magnetic poles of the sensor magnet. Namely, $N_p*f$ indicates the repetition frequency at which the magnetic field changes per second.

The following expression regarding the thickness t (in meter) of that part of the housing 203 which is between the sensor magnet 202 and the magnetic sensor 201, can be derived from the above inequality (38):

[Expression 39]

$$t \leq 0.511\delta_{skin} = 257\sqrt{\frac{\rho}{N_p f(1+\chi)}} \tag{39}$$

Numerically calculated by using the expression (39), the thickness t of the housing 203 is 1.3 mm or less when $N_p=4$ (in case of a 8-pole magnet), rotational frequency equals 15,000 rpm, and aluminum (resistivity $\rho=2.75\times10^{-8}$ $\Omega$m) is used as the material of the housing.

Alternatively, when $N_p=4$ (in case of a 8-pole magnet), rotational frequency equals 15,000 rpm, and brass, i.e. Cu(65%)-Zn(35%) alloy, (resistivity $\rho=6\times10^{-8}$ $\Omega$m) is used as the material of the housing 203, the thickness t of the housing 203 is 1.9 mm or less, calculated from the expression (39).

Figure 16:
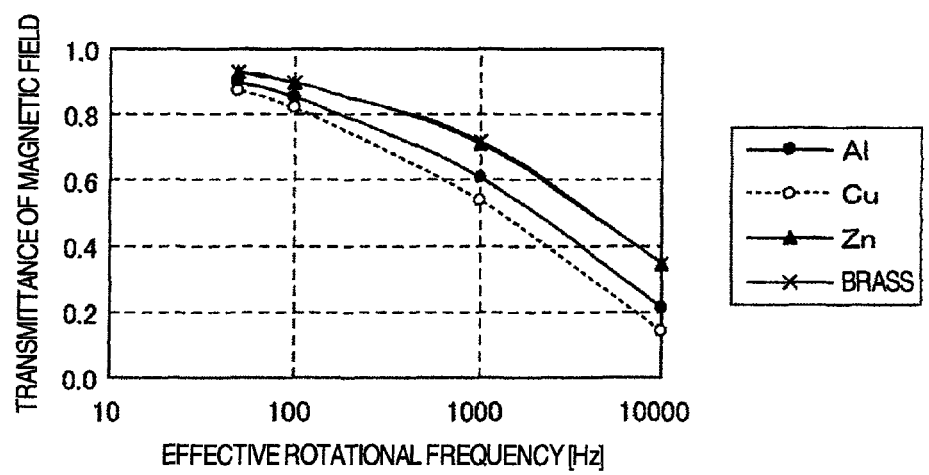
FIG. 16 graphically shows the relationship between rotational frequency of rotation shaft and transmittance of magnetic field.

When magnetic field varying with time passes through a substance, free electrons in the substance generate eddy currents, which attenuates the intensity of the magnetic field passing through the substance. FIG. 16 graphically shows the relationship between effective rotational frequency and transmittance of magnetic field, for various materials having a thickness of 1.3 mm. In FIG. 16, the abscissa denotes effective rotational frequency giving by $N_p \times f$, equal to the number of rotation per second of the magnetic field. It is understood that material having the lower resistivity causes the smaller thickness $\delta_{skin}$ for skin effect and hence the weaker magnetic field passing through the material. In order to obtain magnetic field with intensity strong enough for the magnetic sensor 201 to be able to detect the orientation of the field, it is required that the permeability of the material should be 0.6 or more. This is the condition required by the expression (38).

The above description concludes that the thickness of that part of the housing 203 which is between the sensor magnet 202 and the magnetic sensor 201 should satisfy the above mentioned requirements. The other parts of the housing 203 may be thicker.

In this embodiment, on the basis of the above analysis, aluminum is used as material for the housing 203, and the thickness of that part of the housing 203 which is between the sensor magnet 202 and the magnetic sensor 201 is set to 1.3 mm. Accordingly, a rotational angle-measurement apparatus can be obtained which detects the rotational angle accurately even when the rotation shaft is rotated at 15,000 rpm.

Figure 1:
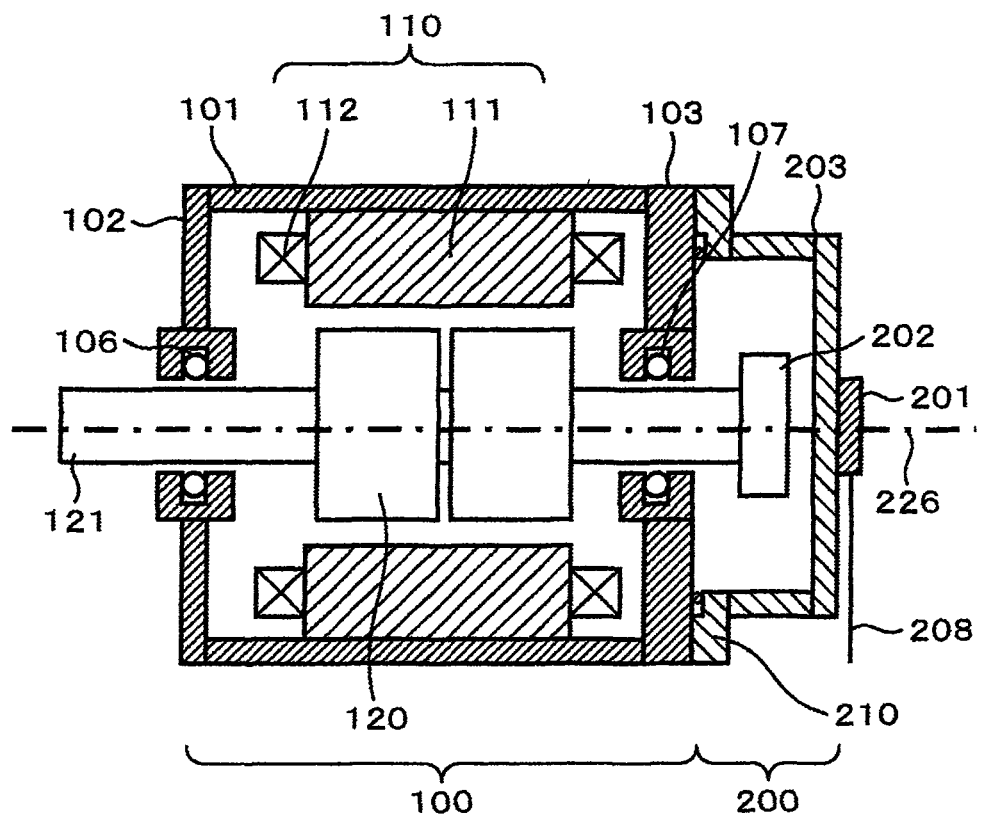
FIG. 1 is a cross-sectional view of a rotational angle-measurement apparatus as the fifth embodiment of this invention.
Figure 2:
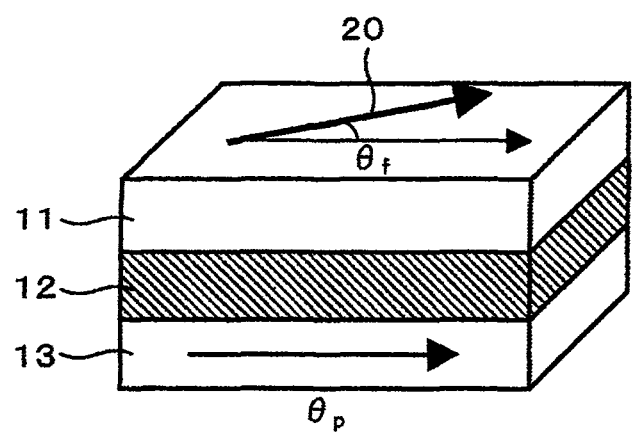
FIG. 2 schematically shows the structure of a giant magneto-resistance element.
Figure 3A:
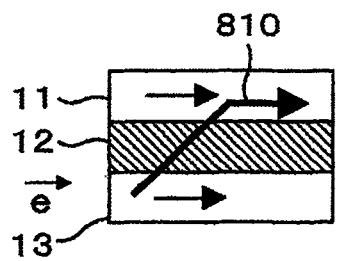
FIGS. 3A and 3B schematically illustrate the behavior of electrons in a giant magneto-resistance element.
Figure 3B:
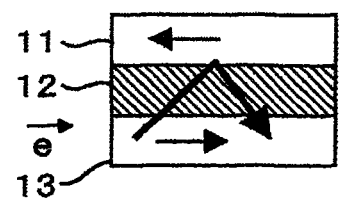

Further, as shown in FIG. 1, it is preferable that the magnetic sensor 201 should be disposed in alignment with the center line 226 of the rotation shaft 121. To be more concrete, the sensor element unit 301 in the magnetic sensor 201 should preferably be disposed in alignment with the center line 226 of the rotation shaft 121. The reason for this is: since the distribution of the magnetic field generated by the sensor magnet 202 becomes almost parallel along the center line 226 of the rotation shaft, the amount of correction of the field distribution can be small with this configuration. Still preferably, if the difference attributable to the field distribution, between the magnetic field angle $\theta_m$ and the rotor angle $\theta_r$ falls within a tolerable range, correction becomes needless.

Now, the sixth embodiment of this invention will be described.

The rotational angle-measurement apparatus used in this embodiment is the same as that shown in FIG. 1.

This rotational angle-measurement apparatus has the magnetic sensor 201 disposed on the outer surface of the housing 203. Accordingly, if a magnetic material body such as iron is in the vicinity of the rotational angle-measurement apparatus, it may sometimes affect the spatial distribution of the magnetic field generated by the sensor magnet 202. As a result, the change in the spatial distribution of the magnetic field changes the relationship between the rotational angle $\theta_r$ of the rotation shaft 121 and the magnetic field angle $\theta_m$ to be detected by the magnetic sensor 201.

In such a case, according to a conventional method in which a rotational angle-measurement apparatus is incorporated into a system after it has been corrected by a correction actuator-encoder, the thus incorporated rotational angle-measurement apparatus cannot measure rotational angle $\theta_r$ correctly.

According to this embodiment, the rotational angle-measurement apparatus, already incorporated into an interested system, measures the correspondence of $\theta_r$ to $\theta_m$ while the rotation shaft 121 is being rotated N times at a constant speed. The concrete procedure is as described above with the first embodiment.

In this way, according to this embodiment, since correction procedure is performed with the rotational angle-measurement apparatus incorporated in the interested system, then even when the spatial distribution of magnetic field changes due to the influence of nearby magnetic material body, the correspondence of $\theta_r$ to $\theta_m$ in such a changed distribution of magnetic field is measured. Accordingly, rotational angle $\theta_r$ can be correctly measured also in a correct system.

The seventh embodiment of this invention will now be described with reference to FIGS. 17 and 18.

Figure 17:
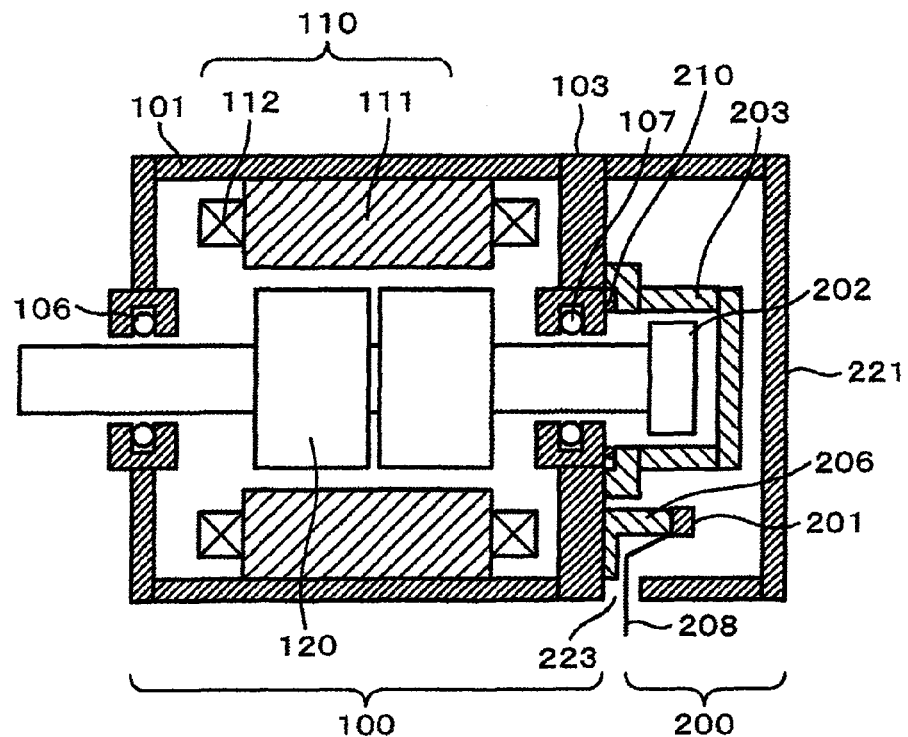
FIG. 17 a cross-sectional view of a rotational angle-measurement apparatus as the seventh embodiment of this invention.

FIG. 17 is a cross-sectional view of a rotational angle-measurement apparatus according to this embodiment. FIG. 18 is a side view from right of the rotational angle-measurement apparatus shown in FIG. 17, that is, FIG. 17 is the cross-sectional view along the line A-B in FIG. 18.

The structure of a motor unit 100 of this embodiment is the same as that of the third embodiment described above.

A rotational angle-detection unit 200 consists mainly of a magnetic sensor 201, a sensor magnet 202, a housing 203 and a cover 221.

The feature of this embodiment is that the rotational angle-detection unit 200 has the cover 221. The cover 221 is made of material having magnetic susceptibility $\chi$ of 100 or more.

Magnetic shield effect is created by covering the rotational angle-detection unit 200 with the cover 221 made of material having magnetic susceptibility $\chi$ of 100 or more. As a result, even when a magnetic material body is placed in the vicinity of the rotational angle-detection unit 200, the special distribution of the magnetic field generated by the sensor magnet 202 is hardly interfered. In this way, the influence from the environment in which the rotational angle-measurement apparatus is placed, can be greatly reduced so that rotational angle measurement can be performed correctly.

Materials having magnetic susceptibility $\chi$ of 100 or more include soft iron ($\chi$=2000), iron ($\chi$=5000), silicon steel ($\chi$=7000), Mu-metal ($\chi$=100,000), etc. Iron is employed in this embodiment.

Material having magnetic susceptibility of 0.01 or less is used for the housing 203 which is located between the sensor magnet 202 and the magnetic sensor 201. In this embodiment, a 1.3 mm thick aluminum sheet is used to form the housing.

Water-proof structure is effectuated by inserting a sealant 210 between the housing 203 and the motor unit 100. In this embodiment, the housing 203 and the motor unit 100 form a water-proof boundary.

The magnetic sensor 201 is fixed on a sensor support 206 mounted rigidly on the second bracket 103. The sensor support 206 is made of material having magnetic susceptibility of 0.01 or less so as to prevent the distribution of magnetic field from being disturbed.

Since the magnetic sensor 201 is located outside the water-proof boundary, assembly becomes easier. It is especially easy to take out the lead wires 208 of the magnetic sensor 201 from inside the rotational angle-measurement apparatus.

A hole 223 is made through the cover 221. The hole 223 serves as an exit for taking out the lead wires 208 through and as a vent for drainage. That is to say, even if water somehow pools in the rotational angle-detection unit 200, it may drain through the hole. Since water has magnetic susceptibility $\chi = -9 \times 10^{-6}$, it imposes no influence on the distribution of static magnetic field. However, if water exists there over a long period of time, a problem may arise that the water may cause rust and/or degradation of insulation. Therefore, water in the rotational angle-detection unit 200 should preferably be drained as soon as possible.

Figure 18:
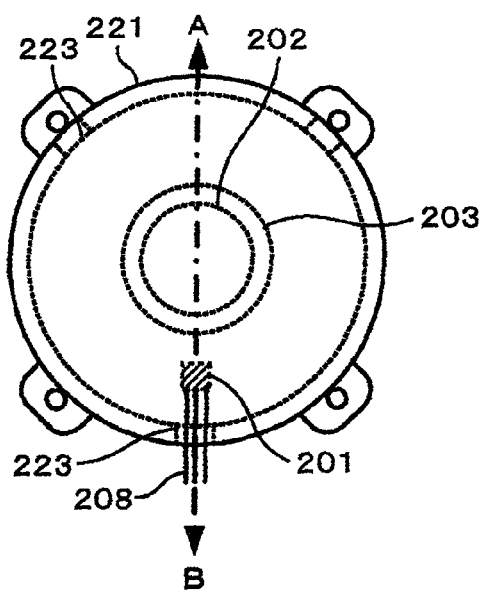
FIG. 18 is a side view of the rotational angle-measurement apparatus as the seventh embodiment of this invention.

Further, according to this embodiment, holes for water drainage are made in three positions as shown in FIG. 18 so as to drain the water pooling inside through them whatever posture the rotational angle-measurement apparatus may take.

When the cover 221 made of material having high permeability is attached to the rotational angle-measurement unit 200, the spatial distribution of the magnetic field generated by the sensor magnet 202 is changed because the magnetic flux issuing from the magnet passes easily through the material of high permeability.

In such a case, after the cover 221 has been attached, correction procedure as described above should be performed by measuring the relationship between the rotational angle $\theta_r$ of the rotation shaft 121 and the magnetic field angle $\theta_m$.

According to this embodiment, since the external environment where the rotational angle-measurement apparatus is placed exerts only a sufficiently small influence on the distribution of magnetic field, sufficient measurement accuracy can be secured without re-correction that may otherwise be made after the installation of the rotational angle-measurement apparatus.

The eighth embodiment of this invention will be described below with reference to FIGS. 19 and 20.

Figure 19:
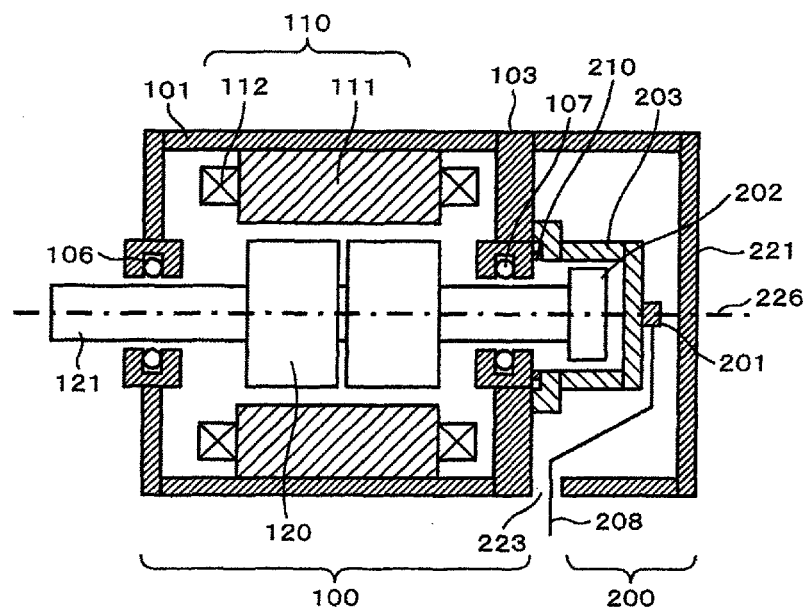
FIG. 19 a cross-sectional view of a rotational angle-measurement apparatus as the eighth embodiment of this invention.
Figure 20:
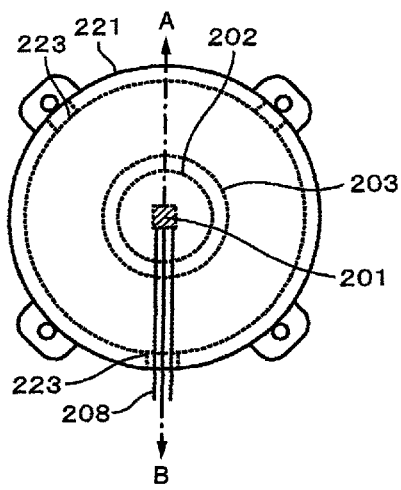
FIG. 20 is a side view of the rotational angle-measurement apparatus as the eighth embodiment of this invention.

FIG. 19 is a cross-sectional view of a rotational angle-measurement apparatus according to this embodiment. FIG. 20 is a side view from right of the rotational angle-measurement apparatus shown in FIG. 19, that is, FIG. 19 is the cross-sectional view along the line A-B in FIG. 20.

The structure of a motor unit 100 of this embodiment is the same as that of the third embodiment described above.

The structure of a rotational angle-detection unit 200 is the same as that of the fourth embodiment described above. However, this eighth embodiment is featured in that the magnetic sensor 201 is in alignment with the centerline 226 of the rotation axis of the sensor magnet 202.

Since the distribution of magnetic field is nearly parallel along the centerline of the rotation axis of the sensor magnet, the advantage can be enjoyed that the amount of correction of magnetic field can be lessened.

In this embodiment, since the magnetic sensor 201 is mounted directly on the housing 203, the provision of the sensor support 206 is unnecessary so that the structure is advantageously simplified.

(Rotational Speed-Measurement Apparatus)

The ninth embodiment of this invention will be described below with reference to FIGS. 21 and 22.

Figure 21:
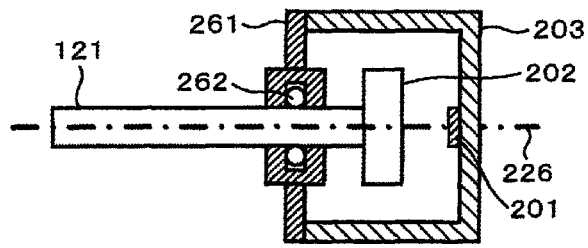
FIG. 21 is a cross-sectional view of a rotational speed-measurement apparatus as the ninth embodiment of this invention.

FIG. 21 is a cross-sectional view of a rotational speed-measurement apparatus according to this invention.

This embodiment comprises a rotation shaft 121 rotating synchronously with an object whose rotational speed is to be measured, a sensor magnet 202 fixedly attached to the end of the rotation shaft 221, and a magnetic sensor 201 for detecting the orientation of the magnetic field generated by the sensor magnet 202. The rotation shaft 121 is rotatably supported by means of a bearing 262 mounted on a housing 261. The magnetic sensor 201 is fixedly mounted on the housing 203.

The housing 203 is made of material having magnetic susceptibility of 0.01 or less so as not to disturb the spatial distribution of the magnetic field. In this embodiment, the housing of resin-molded structure is used.

The magnetic sensor 201 is so disposed that it may be in alignment with the center line 226 of the rotation axis of the sensor magnet 202. Since the magnetic field generated by the sensor magnet 202 is nearly parallel along the center line 226 of the rotation axis 226, the magnetic sensor 201 should preferably be located in this position to reduce the difference between the rotational angle $\theta_r$ of the rotation shaft 121 and the magnetic field angle $\theta_m$.

The magnetic sensor 201 comprises a COS bridge and a SIN bridge, which deliver signals proportional to $\cos\theta_m$ and $\sin\theta_m$, respectively. Now, let B denote a proportionality constant, then the COS and SIN bridges deliver signal voltages denoted as $V_x = B\cos\theta_m$ and $V_y = B\sin\theta_m$, respectively.

The time-derivative of the signal voltage $V_x$ is as follows.

[Expression 40]

$$\frac{dV_x}{dt} = -B\sin\theta_m \frac{d\theta_m}{dt} \tag{40}$$

Therefore, the rotational speed $\omega_m = d\theta_m/dt$ of the magnetic field angle $\theta_m$ is obtained as follows.

[Expression 41]

$$\omega_{m1} = \frac{d\theta_m}{dt} = -\frac{1}{V_y}\frac{dV_x}{dt} \tag{41}$$

In like manner, the time-derivative of the signal voltage $V_y$ of the SIN bridge can yield the rotational speed as follows.

[Expression 42]

$$\omega_{m2} = \frac{d\theta_m}{dt} = \frac{1}{V_x}\frac{dV_y}{dt} \tag{42}$$

In this way, the rotational speed of the magnetic field angle $\theta_m$ is obtained. This procedure has features as described below.

First, the rotational speed can be obtained without resort to the procedure using ArcTan function (arc-tangent process). Additionally, since the proportionality constant B included in the signal voltages, comes to be canceled, the rotational speed can be obtained only through the division of the time-derivative of $V_x$ by $V_y$. Whereas calculation using ArcTan function usually needs much time of computation, the method according to this embodiment, that need not rely upon ArcTan function, can realize a rotational speed-measurement apparatus that can be applied to high speed measurements.

Secondly, although the expressions (41) and (42) perform different signal processings, the results of both processes are the same as each other, that is, the rotational speed of the magnetic field angle $\theta_m$. Therefore, $\omega_{m1}$ and $\omega_{m2}$ must take the same value. In other words, if they take different values, that indicates an abnormal condition taking place in the rotational speed-measurement apparatus.

To be concrete, measurement accuracy being taken into consideration, a fault-detection signal is generated only if the difference between the one value and the other value falls outside a certain range of values.

Figure 22:
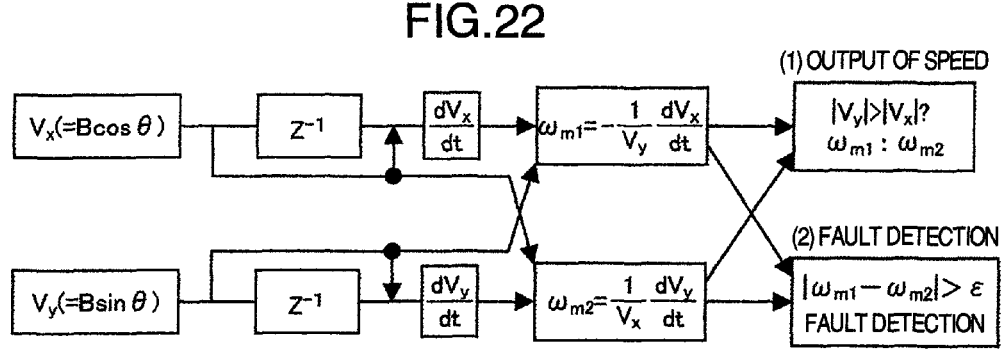
FIG. 22 is a diagram used for describing the algorithm of signal processing in the rotational speed-measurement apparatus as the ninth embodiment of this invention.

FIG. 22 diagrammatically shows a signal flow associated with a concrete method for detecting the rotational speed in accordance with the operation as described above. In FIG. 22, "$Z^{-1}$" indicates a delay process per clock. The delay processes are followed by differentiation processes. Then, the processes corresponding to the expressions (41) and (42) are performed. The absolute values of $V_x$ and $V_y$ are compared with each other, and the value of that rotational speed which is calculated through the division by the larger of $V_x$ and $V_y$ is adopted. In this way, the increase in the error caused through the division by a value nearly equal to zero is avoided.

At the same time, the difference between $\omega_{m1}$ and $\omega_{m2}$ is calculated, and when the difference exceeds a certain fixed value $\epsilon$, a fault-detection signal is issued.

The foregoing description is dedicated to the rotational speed-measurement apparatus, but the combination of the rotational speed-measurement apparatus and one of the rotational angle-measurement apparatuses of the above embodiments will be likewise useful. To be concrete, the signal processing method as shown FIG. 22 may be incorporated in the above described detection circuit unit 302. Such a configuration, which can obtain both the rotational angle $\theta_r$ and the rotational speed ω simultaneously, is useful when applied as a sensor for the vector control of an electric motor.

Further, another configuration is also useful in which only the fault-detection function employed in the method as shown in FIG. 22 is incorporated in the rotational angle-measurement apparatus described as any one of the embodiments as described above. In this way, a rotational angle-measurement apparatus having a fault-detection function can be obtained. According to the method described above, fault-detection can be effectuated through a small amount of computation so that the delay from the occurrence of a fault to the detection thereof can be shortened and also that the reliability of the rotational angle-measurement apparatus is strengthened.

Figure 23:
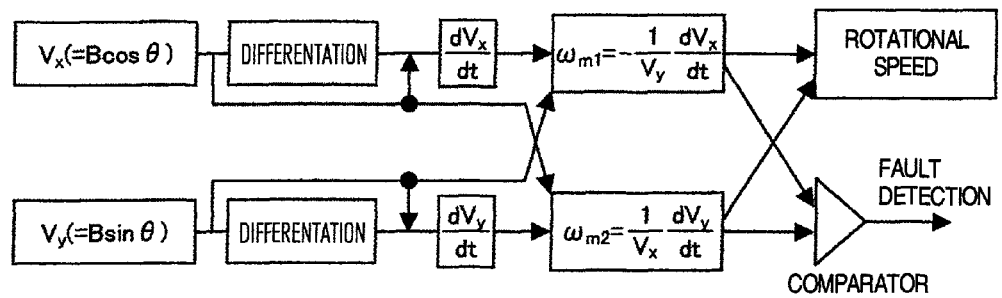
FIG. 23 is a diagram used for describing the algorithm of signal processing in a rotational speed-measurement apparatus as the 10th embodiment of this invention.

The eleventh embodiment of this invention will be described with reference to FIG. 23. This embodiment is the same as the rotational speed-measurement apparatus shown in FIG. 21 except that the processing circuitry is replaced by analog circuitry having the same functions. FIG. 23 is a block diagram of the processing circuitry.

The processing circuitry is composed of differentiation circuits and dividing circuits, all of which are built with analog components, and the fault-detection process is performed by a comparator.

According to this embodiment, since the processing circuitry can be realized with analog components alone, real-time processing can be effected. Also, since there is no need for a micro-controller, there is provided a rotational angle-measurement apparatus immune to environmental impacts such as high temperatures.

The twelfth embodiment of this invention will be described with reference to FIGS. 30A and 30B.

This embodiment is the same as the first embodiment as described above except that the detection circuit unit 302 is changed in position in the magnetic sensor 201.

Figure 30A:
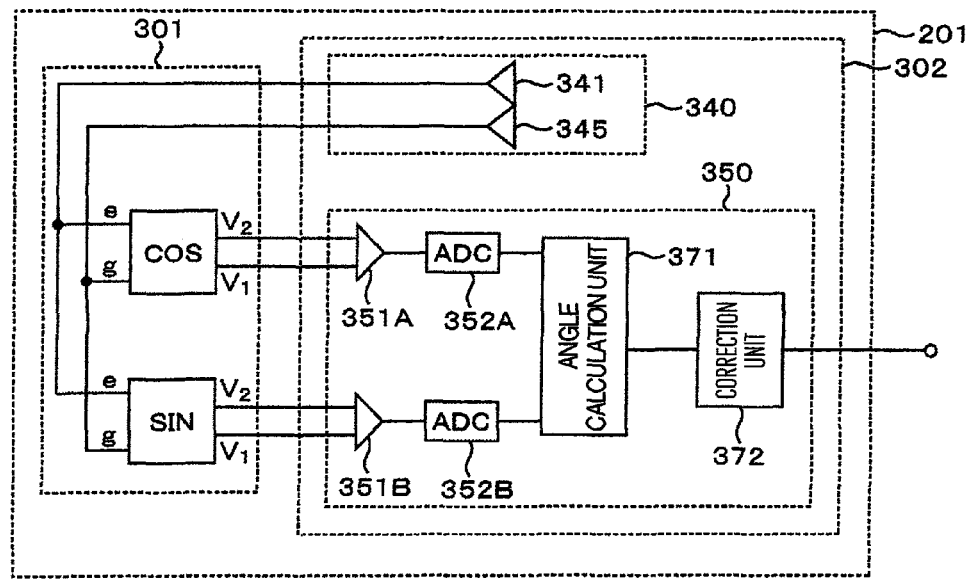
FIGS. 30A and 30B schematically show the structure of the magnetic sensor used in the 11th embodiment of this invention.

In the first embodiment, the sensor element unit 301 and the detection circuit unit 302 are incorporated in the magnetic sensor 201, as shown in FIG. 30A.

Figure 30B:
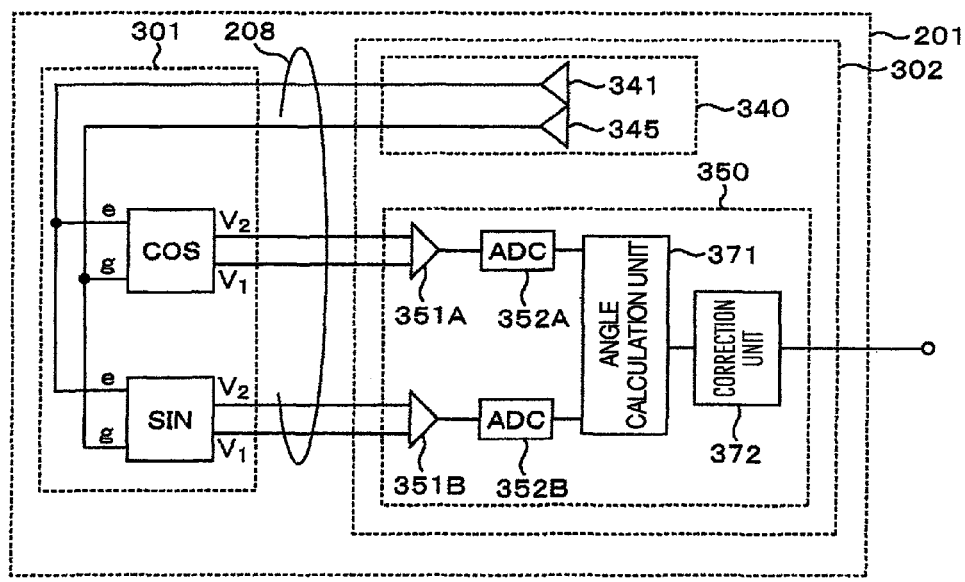

In this twelfth embodiment, on the other hand, as shown in FIG. 30B, the sensor element unit 301 alone is disposed in the position of the magnetic sensor 201 shown in FIG. 5 while the detection circuit unit 302 (not shown in FIG. 5) is disposed outside the housing 203 shown in FIG. 5. As shown in FIG. 30B, excitation voltages are generated by the driving circuit unit 340 in the detection circuit unit 302, and the generated excitation voltages are transferred via the signal lead wires 208 and applied to the sensor element unit 301. The signal output from the sensor element unit is transferred via the signal lead wires 208 and applied to the detection circuit unit 302. After this, signal processing and correction procedures are the same as those employed in the first embodiment.

In this embodiment, the detection circuit unit 302 is disposed at a distance from the motor unit 100. In general, the signal processing circuit constituting the main part of the detection circuit unit 302 is operable within a relatively narrow temperature range of −40° C.~125° C., and therefore said to be vulnerable to high temperatures or extremely low temperatures. On the other hand, however, the motor unit 100 may often be disposed in an environment of high temperatures or may by itself generate heat depending on conditions for use. Accordingly, this embodiment has the advantage that the range of temperatures in which the motor unit 100 is operated can be expanded due to the detection circuit unit 302 being disposed at a distance from the high temperature zone.

The rotational angle-measurement apparatus of this embodiment comprises the motor unit 100 shown in FIG. 5, the rotational angle-detection unit 200 and the detection circuit unit 302 disposed outside the housing 203.

The detection circuit unit 302 may be incorporated in the electronic control unit ECU of the system that includes the rotational angle-measurement apparatus therein. Also, signal processings such as angle calculation and correction may be performed by the microcomputer installed in the ECU of the system. With this constitution employed, redundant portion in the signal processing unit can be eliminated so that a rotational angle-measurement apparatus can be provided at low cost.

Figure 31:
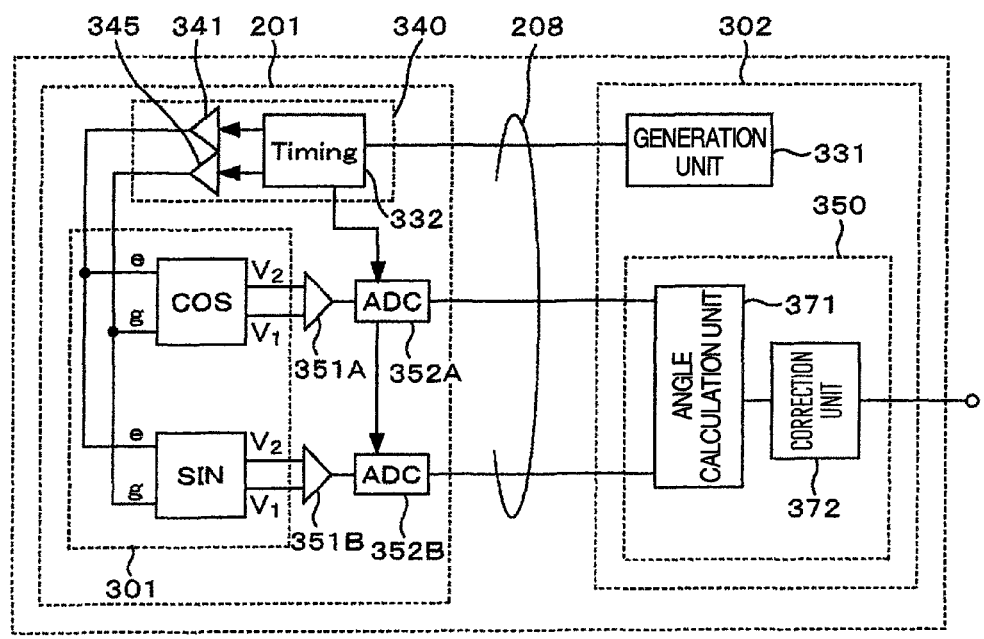
FIG. 31 schematically shows the structures of the magnetic sensor and the detection circuit unit used in the 11th embodiment of this invention.

The configuration shown in FIG. 31 as an intermediate configuration between those shown in FIGS. 30A and 30B are useful depending on conditions for use. In the configuration shown in FIG. 31, the driving circuit unit 340, the detection circuits 351 and the AD converters 352 are included in the magnetic sensor 201 disposed within the housing 203 while the detection circuit unit 302 is disposed at a distance.

An example has been described above in which the detection circuit unit 302 is disposed outside the housing 203. However, the detection circuit unit 302 may be disposed inside the housing 203.

Also, in the case of the fifth embodiment, where the magnetic sensor 201 is disposed outside the housing, the configuration shown in FIG. 30B is useful. The reason for its usefulness is that the detection circuit unit 302 can be disposed at a distance from a high temperature zone and that redundancy in circuit construction can be eliminated by causing the ECU of the system to cooperate in signal processing.

The detection circuit unit 302 includes an angle calculation unit 371, a correction unit 372 and a timing signal generation unit 331. The timing signal generation unit 331 is a logic unit for generating the timing signal that helps the AD converters in the magnetic sensor 201 to perform their conversion operations.

The magnetic sensor 201 comprises a sensor element unit 301, a driving circuit unit 340, detection circuits 351A and 351B, and AD converters 351A and 351B. The driving circuit unit 340 includes a timing signal generation unit B 332, which performs timing control in the magnetic sensor 201 in response to the signal from the timing signal generation unit A 331. To be concrete, the timing signal generation unit B 332 generates timing signals for forming pulses from excitation voltages and applies the pulses to the positive-polarity output unit 341 and the negative-polarity output unit 345. And synchronously with the pulse application, the timing signal generation unit B 332 sends out signals also to the AD converters 352A and 352B in order to detect the output signals from the sensor element unit 301.

The signals outputted from the sensor element unit 301 are deferentially amplified by the detection circuit 351A to deliver an output, which is converted to a digital signal by the AD converter 352A. This digital signal is transferred to the detection circuit unit 302 via the signal lead wires 208. The digital signal should preferably be transferred in the form of serial signal since serial transfer of signal can reduce the number of signal lines serving as the signal lead wires 208.

With this configuration, the signal from the sensor element unit 301 is first converted to the corresponding digital signal, and then the digital signal is transferred through the signal lead wires 208. Accordingly, the advantage is enjoyed that the signal becomes less vulnerable to noise.

Three examples of the structures for the magnetic sensor 201 have hitherto been described as shown in FIGS. 30A, 30B and FIG. 31. However, it will be needless to say that any intermediate structure among them is feasible and within the scope of this invention.

It is also needless to say that the configuration in which the detection circuit unit 302 is disposed at a distance can be usefully applied in embodiments other than the embodiment 1.

Throughout this specification of the present invention, description is made with giant magneto-resistance elements (GMR elements) used for the magneto-resistance elements for the purpose of measuring magnetic field. Further, the magneto-resistance elements include anisotropic magneto-resistance elements. Therefore, a rotational angle-measurement apparatus using anisotropic magneto-resistance elements can be said to fall within the scope of the present invention.

It should be further understood by those skilled in the art that although the foregoing description has been made on embodiments of the invention, the invention is not limited thereto and various changes and modification may be made without departing from the spirit of the invention and the scope of the appended claims.

The invention claimed is:

1. A rotational angle-measurement apparatus comprising:
an electric motor having a rotation shaft,
a magnet mounted on one end of the rotation shaft, and
a magnetic sensor whose output signal changes in accordance with an orientation of a magnetic field surrounding the magnetic sensor and that outputs an angle signal representing the rotational angle of the rotation shaft,
wherein the rotational angle-measurement apparatus has a procedure of correction, in which the rotation shaft of the electric motor is rotated through more than one revolution at a rotational speed whose rate of change with time is known,
wherein the rotational angle-measurement apparatus has information on the rate of change of the rotational speed, and
wherein a look-up table is obtained through the procedure of correction, and, using the look-up table, the angle signal can be corrected.

2. The rotational angle-measurement apparatus as claimed in claim 1, wherein in the procedure of correction, the rotation shaft of the electric motor is rotated through more than one revolution at a constant rotational speed so that the angle signal can be corrected.

3. The rotational angle-measurement apparatus as claimed in claims 1, wherein the magnet is a two-pole magnet.

4. The rotational angle-measurement apparatus as claimed in claims 1, wherein the magnetic sensor has a sensor element unit and the sensor element unit is in alignment with the center line of the rotation shaft.

5. The rotational angle-measurement apparatus as claimed in claim 1, wherein the magnetic sensor consists mainly of magneto-resistance elements.

6. The rotational angle-measurement apparatus as claimed in claim 1, wherein the magnetic sensor consists mainly of giant magneto-resistance elements.

* * * * *